US011455074B2

(12) United States Patent
Osipov et al.

(10) Patent No.: US 11,455,074 B2
(45) Date of Patent: Sep. 27, 2022

(54) SYSTEM AND USER INTERFACE FOR VIEWING AND INTERACTING WITH THREE-DIMENSIONAL SCENES

(71) Applicant: Occipital, Inc., Boulder, CO (US)

(72) Inventors: Kirill Osipov, Kaluga (RU); Anton Romanov, Bashkortostan (RU); Anton Yakubenko, Boulder, CO (US); Gleb Krivovyaz, Moscow (RU); Jeffrey Roger Powers, San Francisco, CA (US); Vikas Muppidi Reddy, Boulder, CO (US)

(73) Assignee: Occipital, Inc., Boulder, CO (US)

( * ) Notice: Subject to any disclaimer, the term of this patent is extended or adjusted under 35 U.S.C. 154(b) by 0 days.

(21) Appl. No.: 17/301,874

(22) Filed: Apr. 16, 2021

(65) Prior Publication Data

US 2021/0326026 A1    Oct. 21, 2021

Related U.S. Application Data

(60) Provisional application No. 63/011,432, filed on Apr. 17, 2020.

(51) Int. Cl.
*G06F 3/04815* (2022.01)
*G06F 3/04845* (2022.01)
*G06F 3/0482* (2013.01)

(52) U.S. Cl.
CPC ........ *G06F 3/04815* (2013.01); *G06F 3/0482* (2013.01); *G06F 3/04845* (2013.01)

(58) Field of Classification Search
None
See application file for complete search history.

(56) References Cited

U.S. PATENT DOCUMENTS

| 7,348,997 B1* | 3/2008 | Croft .................. G06T 19/00 345/629 |
| 2003/0038799 A1* | 2/2003 | Smith ................. G06T 19/00 345/420 |
| 2006/0181527 A1* | 8/2006 | England ............... G01S 17/89 345/419 |
| 2007/0146325 A1* | 6/2007 | Poston ................ G06F 3/038 345/163 |
| 2010/0271391 A1* | 10/2010 | Repin ................. G06T 19/00 345/619 |
| 2011/0069071 A1* | 3/2011 | Karlsson ............. G06T 15/00 345/419 |
| 2011/0149041 A1* | 6/2011 | Eccles ................ G06T 7/80 348/46 |
| 2013/0131978 A1* | 5/2013 | Han .................... G06T 17/05 701/436 |

(Continued)

FOREIGN PATENT DOCUMENTS

JP    2016057947 A   *  4/2016

*Primary Examiner* — Mandrita Brahmachari
(74) *Attorney, Agent, or Firm* — Lee & Hayes, P.C.

(57) ABSTRACT

A system configured to generate a three-dimensional scene of a physical environment. In some cases, the system may present the three-dimensional scene such that the user is able to view the model in various different types. The system may also allow the user to capture various measurements associated with the scanned physical environment by selecting different portions of the scene.

20 Claims, 27 Drawing Sheets

(56) References Cited

U.S. PATENT DOCUMENTS

| | | | | |
|---|---|---|---|---|
| 2014/0015924 A1* | 1/2014 | Pryor | ...................... | G06T 15/20 |
| | | | | 348/43 |
| 2014/0022246 A1* | 1/2014 | Ono | ........................ | G09G 5/14 |
| | | | | 345/419 |
| 2014/0047381 A1* | 2/2014 | Fan | ........................ | G06F 16/50 |
| | | | | 715/800 |
| 2014/0240312 A1* | 8/2014 | Vesely | ................ | G06F 3/04815 |
| | | | | 345/419 |
| 2017/0147713 A1* | 5/2017 | Reeves | .................. | G06F 30/17 |
| 2017/0270715 A1* | 9/2017 | Lindsay | .................... | G06T 7/70 |
| 2018/0352158 A1* | 12/2018 | Sugaya | .............. | H04N 5/23238 |
| 2020/0211256 A1* | 7/2020 | Kim | ........................ | G06T 17/05 |

\* cited by examiner

SYSTEM AND USER INTERFACE FOR VIEWING AND INTERACTING WITH THREE-DIMENSIONAL SCENES

CROSS-REFERENCE TO RELATED APPLICATION(S)

This application claims priority to U.S. Provisional Application No. 63/011,432 filed on Apr. 17, 2020 and entitled "System and User Interface for Viewing and Interacting with Three-Dimensional Spaces," which is incorporated herein by reference in their entirety.

BACKGROUND

The presence of three-dimensional (3D) imaging and virtual reality systems is becoming more and more common. In some cases, the imaging system or virtual reality system may be configured to allow a user to interact with a three-dimensional virtual scene of a physical environment. However, interacting with the three-dimensional environment often requires a three-dimensional viewing device and/or complicated setups that are not suitable for all users.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
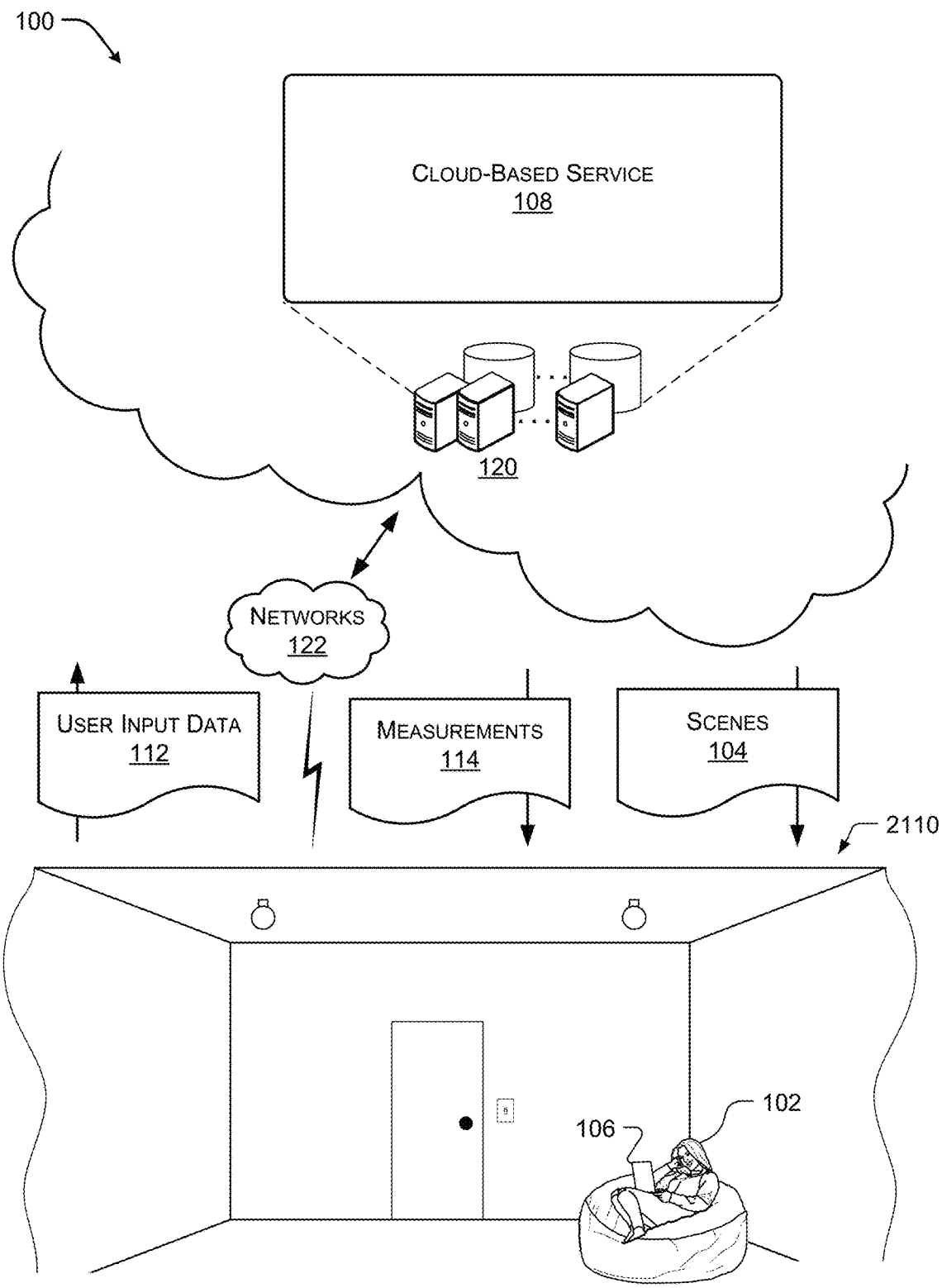
FIG. 1 illustrates an example of a user viewing a three-dimensional scene or model via a user device according to some implementations.
Figure 2:
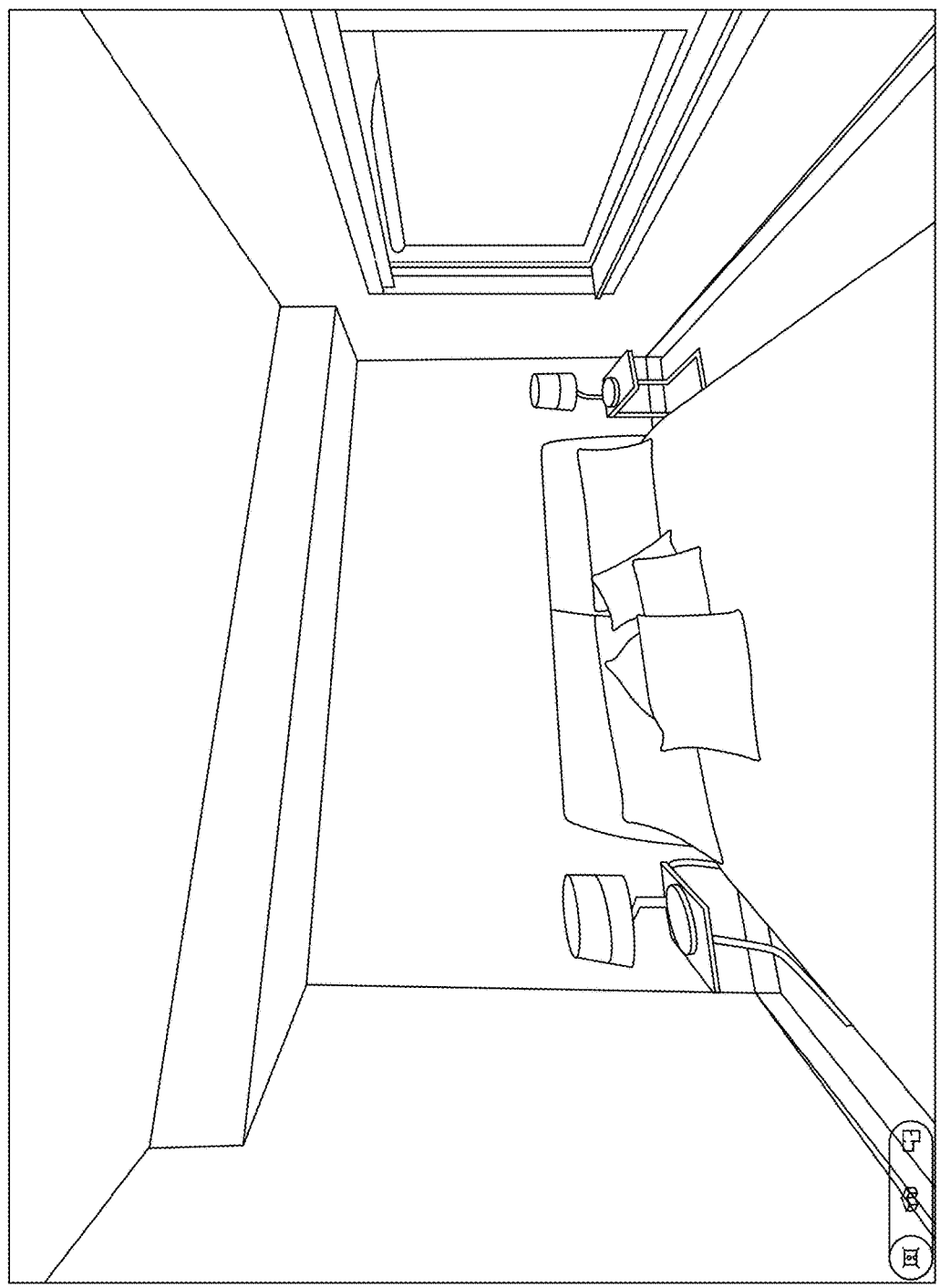
FIG. 2 is an example user interface for viewing a three-dimensional scene of a physical environment according to some implementations.
Figure 3:
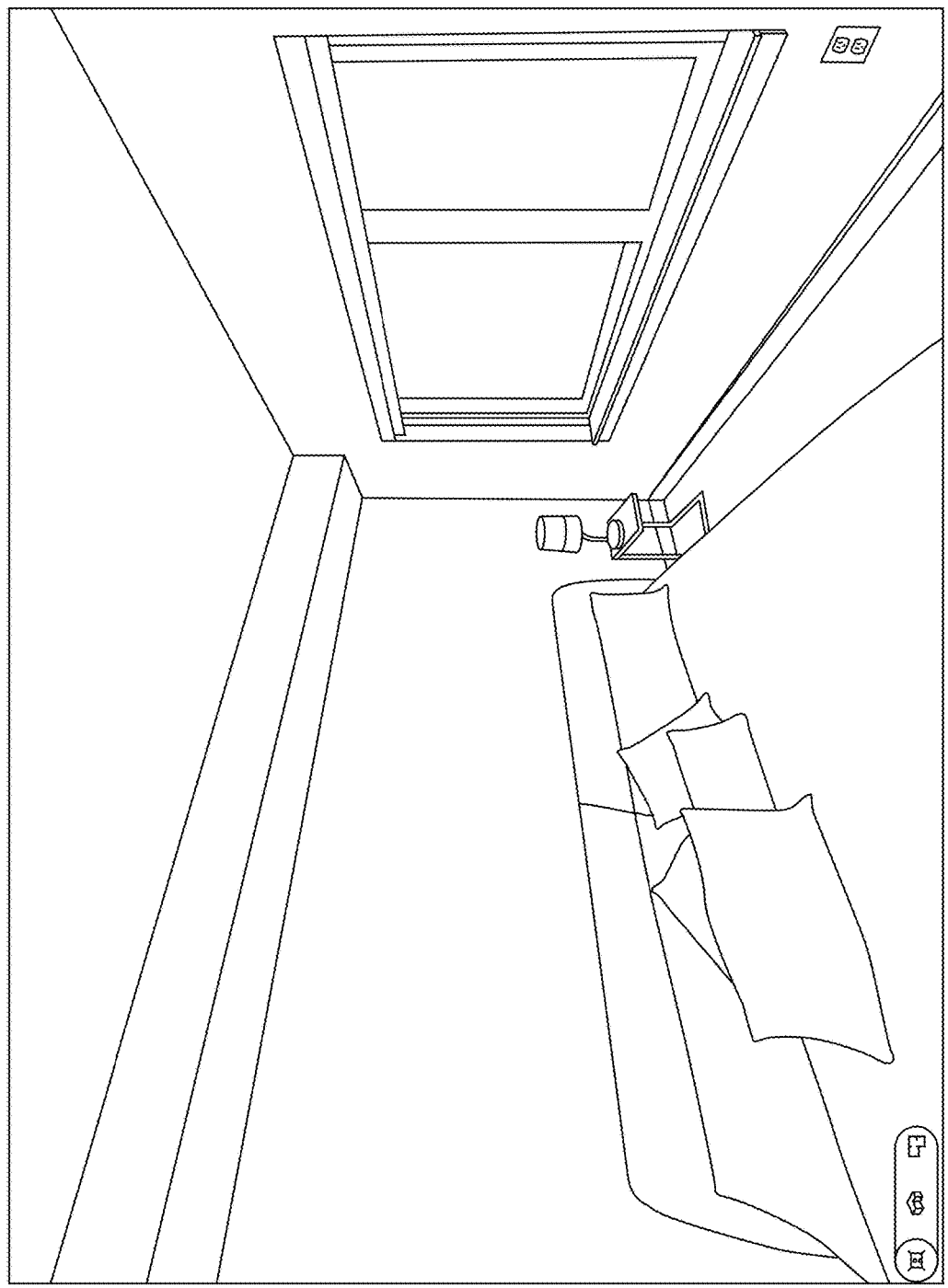
FIG. 3 is another example user interface for viewing a three-dimensional scene of a physical environment according to some implementations.
Figure 4:
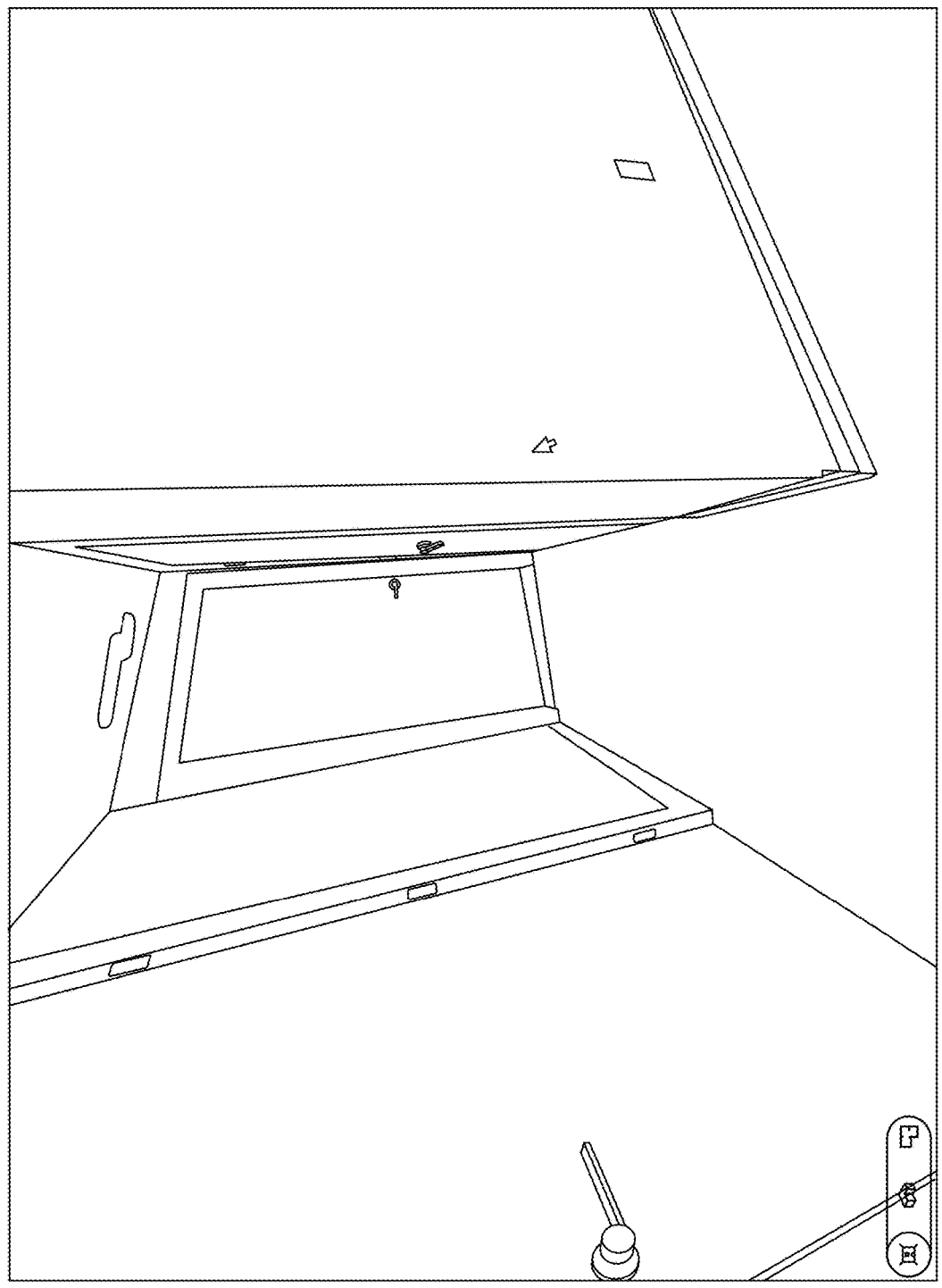
FIG. 4 is another example user interface for viewing a three-dimensional scene of a physical environment according to some implementations.
Figure 5:
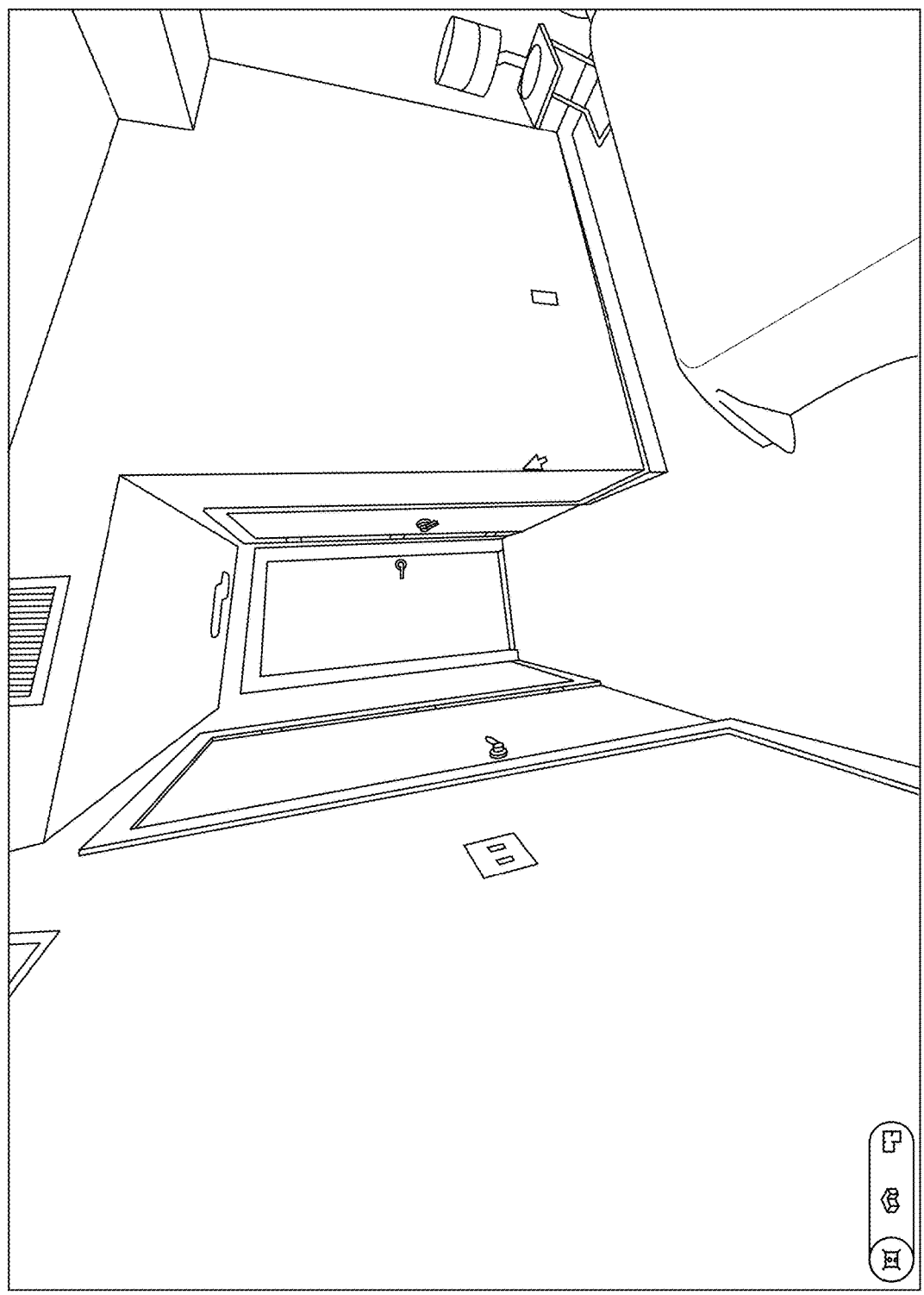
FIG. 5 is another example user interface for viewing a three-dimensional scene of a physical environment according to some implementations.

This disclosure includes techniques and implementations for presenting and viewing stored three-dimensional scene. In some examples, the system may generate three-dimensional models, computer-aided design (CAD) models, point clouds, meshes, semantic scenes, reconstructions, or other models representing real physical environments and locations as well as virtual environments and locations. In some cases, individual physical environments may be viewable as various different types of three-dimensional scene or models, as discussed in more detail below.

In some cases, the system may present a model or reconstruction that may be viewable as a top-down model, bird's eye view, a side view model, or a user navigable reconstruction. In various implementations, the user may switch between views and types of models in substantially real-time. The user may also utilize the models to generate measurements, metrics, and other data associated with the represented physical environment. In some cases, the user may also adjust the models via the viewing system.

In some instances, the models may be viewable via a web-browser, downloadable and/or device hosted application, or shareable link. In this manner, the system does not require specialized software, such as CAD software, to view, edit, and traverse the models and/or scenes. The system also allows the sharing of the models with friends, family, customers, clients, and the like without the need to ensure the receiving party has any particular user equipment or software.

In some cases, the model may be traversable or navigable by the user. For example, the user may move through the model by panning horizontally at a predetermined height or altitude above the floor. In some cases, the height may be selected based on an average height of a human, a known height of the viewing user, a user input, or based on the height of the capture device when the physical environment was scanned. In some cases, a slope may be determined when the user is moving about a terrain or model having variable floor height (such as up or down stairs). The user may then be maintained at the predetermined height above the determined slope.

In some cases, the system may limit the movement of the users to an area defined by a bounding box determined by objects and/or a predetermined distance from a point of capture of the image data used to generate the model. In some cases, the boundary may be configured such that the boundary does not include corners, right angles, or other types of straight intersections. In this manner, the boundary may be a three-dimensional shape that includes only sloped surfaces.

In some examples, the user within the model may be represented as a target point at the predetermined height or altitude above the floor. As the user moves, the user may collide or otherwise intersect with the bounding box. In the event of a collision, the target point may continue to move but the movement may be upward or downward along the bounding box opposed to the horizontal movement representing the user traversing the interior of the model or scene. In other cases, the target point may be moved horizontally along the surface of the bounding box.

In some cases, the system may be configured to provide various types of measurements (such as distances, areas, heights, slopes, angles, and the like). In some examples, the system may allow the user to select a point, line, and/or plane and the system may provide the user with various options based on the normals of the plane or point selected, type of surface selected (e.g., wall, furniture, window, door, or the like) and corresponding objects, planes, and surfaces (such as parallel walls, intersecting planes, nearby corners, and the like) to present the user with various selectable lines and/or points to generate measurements. For example, if a user selects a point on a first wall the system may present lines representing a distance or height from the point to the floor, from the point to the ceiling, from the floor to ceiling, from the first wall to a parallel wall across the environment, as well as an area of the wall or the like. For example, the system may generate selectable measurements based on global normals or grids associated with the environment and/or based on local normals or grids associated with the selected surface or plane.

In some cases, the system may also generate measurements based at least in part on a viewpoint of the user when viewing the model or scene. For example, if a user is viewing an object, such as a door, window, or article of furniture, the system may display the measurements associated with the object (e.g., a window's height, length, depth, area, and the like). In some cases, the measurements generated without the user input may be updated as the user moves around the model or scene. However, in some instances, the measurements may be displayed for a user defined or predetermined period of time before the system generates new viewpoint dependent measurements. In another example, if the user is viewing a bird's eye view or overhead view of the model or scene the system may display the lengths of walls, the total areas, lengths and widths of a room, and the like.

In some implementations, the viewpoint dependent measurements may also be generated based on stored parameters. For example, if a user is viewing a light switch or an electrical outlet, the system may generate the distance between the floor and the outlet and/or a distance between a nearest wall and the outlet as these types of measurements are most likely of interest to the user. In some specific implementations, the parameters used to generate the viewpoint-based measurements may be determined by one or more machine learned models and/or networks.

In some cases, the system may also generate a per environment or per room measurements report, including, for example, a list of various dimensions. For example, the per room report may present the user with total area or square footage, number of windows, number of doors, wall dimensions, ceiling height, area of walls with and without openings, room perimeter, dimensions of doors and windows, number of electrical fixtures (such as switches and power outlets), presence of certain objects in the scene (such as fire extinguishers), and the like. In some cases, the per room report may also include a description of materials, such as trim, flooring, lighting and the like.

In some cases, the system may provide assistance in point selection for generation of measurements. For example, the system may allow the user selection or input to snap or align with axis points (e.g., corners, surface midpoints, lines, and the like) that are in proximity to the position of the user input. For instance, if a user selects a point within a threshold distance of a corner, it is likely the user intended to select the corner and the system may assist by presenting the user with the option to select the corner. In some cases, the system may also present a magnifier about or around the selection point to assist the user in placing more precise user inputs. In some cases, the magnifier may be positioned about the selection point for a predetermined radius or distance. The user may then move the magnifier by adjusting a position of the user input and/or intersecting with (e.g., pushing) the edge of the magnifier.

In some examples, the system may allow the user to draw, outline, or otherwise define an area to determine the lengths of the boundary of the defined area. The system may also determine an area of the bounded region. In some examples, the user may modify the scene or model by adjusting the boundary or measurement inputs. In some cases, the system may, for each position of the user, determine a plurality of circles within the bounded region, select the largest circle, and maintain the measurement of the area at the center of the largest circle as the user traverses the model or scene. The system may also adjust in substantially real-time the position of each displayed measurement to ensure that, from a current viewpoint, each of the displayed measurements is visible and not occluded by other measurements.

FIG. 1 illustrates an example of a user 102 viewing a three-dimensional scene or model 104 via a user device 106 according to some implementations. In the current example, the system, such as the cloud-based services 108 and/or an application hosted on the user device 106, may have generated a three-dimensional scene or model 104 of the physical environment 110 using sensor and/or image data captured during a scanning session. For instance, the user 102 may initialize a three-dimensional scanning or capture session to generate a three-dimensional scene or model 104. The image and/or sensor data capture may be processed by the application on the device 104 and/or by a cloud-based service 106. The user 102 may then view and/or interact with the scenes 104 using, for instance, the device 106.

In some implementations, the user 102 may view and/or interact with the scene or model 104 using the device 106, another device having a two-dimensional display, and/or via a three-dimensional viewing system, such as an immersive wearable three-dimensional display system or glasses. In various instances, the user 102 may traverse the environment such as if the user 102 was physically located within the scene or model 104. The user 102 may also view a top down or bird's eye view of the environment or from various perspectives.

In each different type of view the user 102 may interact or provide user inputs 112, generally indicated by user input data 112, associated with the scene or model 104. Based on the user input data 112, the system (e.g., the cloud-based service 108 and/or the application hosted on the device 106) may generate various measurements 114 and/or adjustments to the model or scene 104. For instance, the user input data 112 may include a user selection, such as a tap, mouse click, or the like on a portion of the model 104. In other cases, the user input data 112 may include a visible or viewed portion of the model 104. In still other cases, such as when an immersive three-dimensional display is used, the user input data 112 may include eye tracking and/or area of interest determinations by the system.

In the cases of user selections (e.g., taps, mouse clicks, and the like), the system may receive the selection of a point, plane, surface, or the like and provide the user with various measurement options based on the normals of the plane or point selected, type of surface selected (e.g., wall, furniture, window, door, or the like) and corresponding objects, planes, and surfaces (such as parallel walls, intersecting planes, nearby corners, and the like) to present the user with various selectable lines and/or points to generate measurements. For example, if the user 102 selects a point on a first wall the system may present lines representing a distance or height from the point to the floor, from the point to the ceiling, from the floor to ceiling, from the first wall to a parallel wall across the model 104, as well as an area of the wall or the like. In example, the system may generate selectable measurements 114 based on global normals or grids associated with the environment and/or based on local normals or grids associated with the selected surface or plane. Once the user selects the types and/or measurement points, the system may display the measurements 114 via the user interface on the device 106, as discussed in more detail below.

In some cases, the system may also generate measurements 114 based at least in part on a viewpoint of the user 102 when viewing the model or scene 104. For example, if a user 102 is viewing an object, such as a door, window, or article of furniture, the system may display the measurements 114 associated with the object (e.g., a window's height, length, depth, area, distances from the object to other objects, distances from edges of the object to edges of the wall or window, and the like). In some cases, the measurements 114 generated without the user input may be updated as the user 102 moves about the model or scene 104. However, in some instance, the measurements 114 may be displayed for a user defined or predetermined period of time before the system generates new viewpoint dependent measurements 114. In another example, if the user 102 is viewing a bird's eye view or overhead view of the model or scene 104, the system may display via the device 106 the lengths of walls, the total areas, lengths and widths of a room, and the like.

In some implementations, as discussed above, the viewpoint dependent measurements 104 may also be generated based on stored parameters. For example, if a user 102 is viewing a light switch or an electrical outlet, the system may generate the distance between the floor and the outlet and/or a distance between a nearest wall and the outlet as these types of measurements are most likely of interest to the user 102. In some specific implementations, the parameters used to generate the viewpoint-based measurements 114 may be determined by one or more machine learned models and/or networks. For example, a machine learned model or neural network may be a biologically inspired technique which passes input data (e.g., the frames or other image/sensor data) through a series of connected layers to produce an output or learned inference. Each layer in a neural network can also comprise another neural network or can comprise any number of layers (whether convolutional or not). As can be understood in the context of this disclosure, a neural network can utilize machine learning, which can refer to a broad class of such techniques in which an output is generated based on learned parameters.

As an illustrative example, one or more neural network(s) may generate any number of learned inferences or heads from the user input data 112. In some cases, the neural network may be a trained network architecture that is end-to-end. Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like. In some cases, the system may also apply Gaussian blurs, Bayes Functions, color analyzing or processing techniques and/or a combination thereof.

In some cases, the system may provide assistance in generating the user inputs 112. For instance, the system may assist with a point selection. As an illustrative example, the system may allow the user input 112 to snap or align with axis points (e.g., corners, surface midpoints, lines, and the like) that are in proximity to the position of the user input 112. For example, the system may allow snapping to axes (e.g., either local or global), elements or objects within the model (such as corners and lines of a model), derivatives of an element or object (such as intersections, midpoints, etc.), visual features in the scene, and the like. In some specific cases, the snapping may be in association with other measurements, such as endpoints of other measurements, midpoints of measurement, and the like. As an illustrative example, if a user 102 selects a point within a threshold distance of a corner, it is likely the user 102 intended to select the corner and the system may assist by presenting the user 102 with the option to select the corner. In some cases, the system may also present a magnifier about or around the point of the user inputs 112 to assist the user 102 in placing more precise user inputs 112. In some examples, the user input data 112 may include an outline or defined an area. In these examples, the system may determine the lengths of the boundary of the defined area and/or an area within the defined area.

In some examples, the user 102 may modify the scene or model 104 based on the user input data 112. For example, the user 102 may pull, adjust, or otherwise alter the model 104 while viewing in various different types of views. For example, the user 102 may pull a wall, enter a width of a hallway or the like. In one particular example, the user 102 may input reference dimensions for a measurement, and the system 100 may in response use the input dimensions to adjust the model or scene accordingly.

In some cases, the user 102 may share a link (such as via email, text message, and the like) to the model or scene using the cloud-based service 108. For example, the cloud-based service 108 may host the model and allow a user to view the model or scene using a browser or hosted application. In this manner, the user 102 may share the model or scene with family and friends that do not have special software installed. In some cases, the user 102 may select specific tools that may be accessed or apply restrictions with respect to the shared model.

FIGS. 2-5 are example user interfaces 200-500 for viewing a three-dimensional scene 202 of a physical environment according to some implementations. In these examples, the user may be viewing the three-dimensional scene 202 as if the user was physically present within the scene 202. As shown, the user may traverse the scene 202 by moving within the scene 202, such as from the viewpoint shown by interface 200 to the viewpoint shown by interface 300. In various examples, the user may rotate, move forward, backward as well as look up and down within the scene 202. In particular, the example user interfaces 200 and 300 illustrate a rotation around a viewpoint and the user interface 400 and 500 illustrate horizontal movements (such as walking) about the scene 202.

In some cases, the user may move through or traverse the scene 202 by panning horizontally at a predetermined height or altitude above the floor. In some cases, the height may be selected based on an average height of a human, a known height of the viewing user, a user input, or based on the height of the capture device when the physical environment was scanned. In some cases, a slope may be determined when the user is moving about a terrain or model having variable floor height (such as up or down stairs). The user may then be maintained at the predetermined height above the determined slope.

For example, the system may limit the movement of the users to an area defined by a bounding box determined by objects and/or a predetermined distance from a point of capture of the image data used to generate the model, such as a predefined viewpoint. In some cases, the boundary may be configured such that the boundary does not include corners, right angles, or other types of straight intersections. In this manner, the boundary may be a three-dimensional shape that includes only sloped surfaces. In some cases, the bounding box may be formed proximate to the edges of the scene 202, such as the walls of a room.

Figure 6:
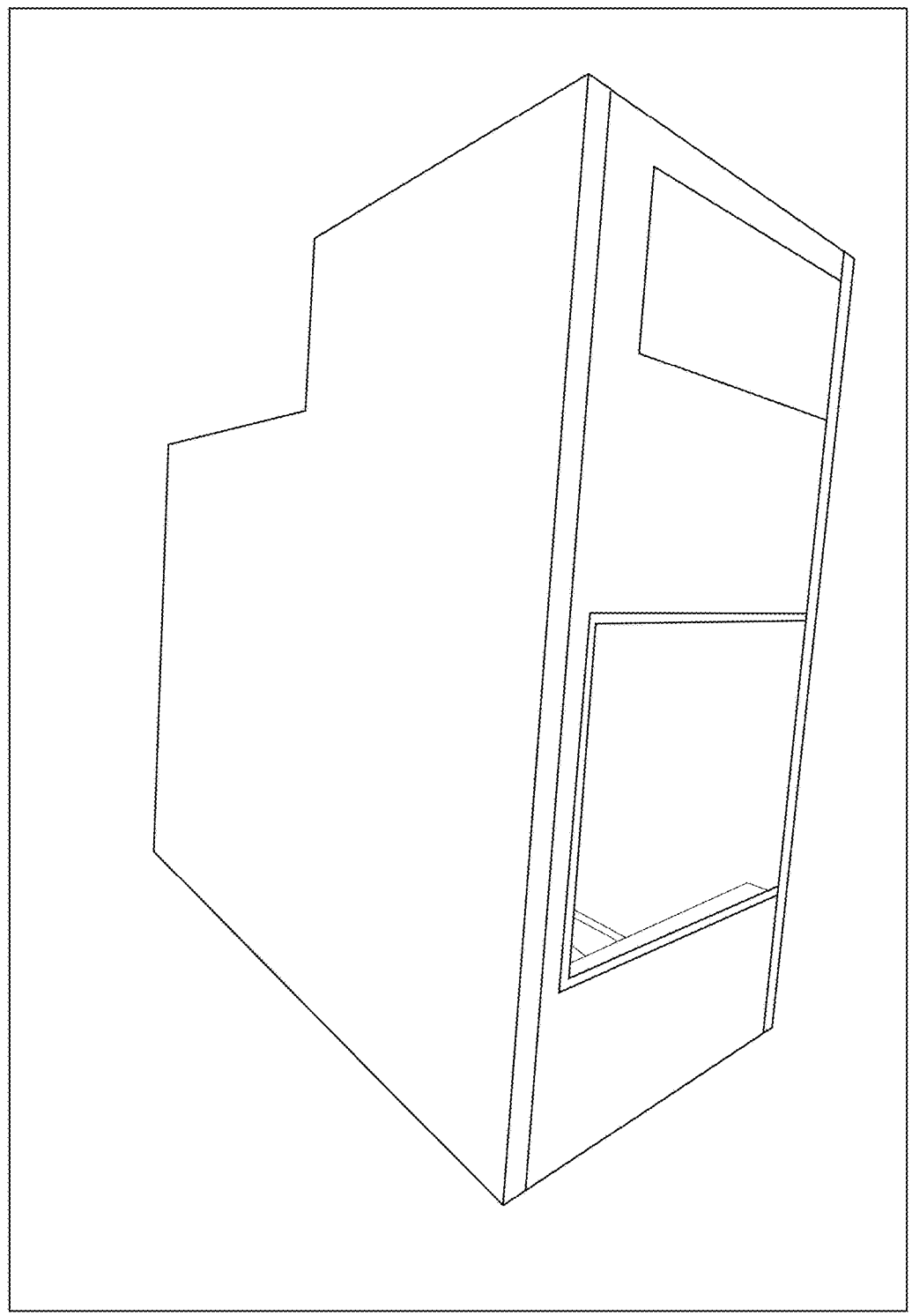
FIG. 6 is another example user interface for viewing a three-dimensional scene of a physical environment according to some implementations.

FIG. 6 is another example user interface 600 for viewing a three-dimensional scene of a physical environment according to some implementations. In this example, the user may be viewing a CAD model or bird's eye view 602 of the physical environment, such as the environment of the scene 202 discussed above with respect to FIGS. 2-5. In the current example, the bird's eye view model 602 is shown with the ceiling in place but in other examples, such as those illustrated below, the ceiling may be removed to allow a user to view the interior of the model 602. The model 602 is shown as a CAD model but in other cases, the model may be represented as a virtual model including color, textures, and the like. In some examples, the user may be able to transition between the scene views of FIGS. 2-5, the CAD model 602 of FIG. 6, and other views, such as the virtual model of FIG. 7 discussed below or a point cloud model.

Figure 7:
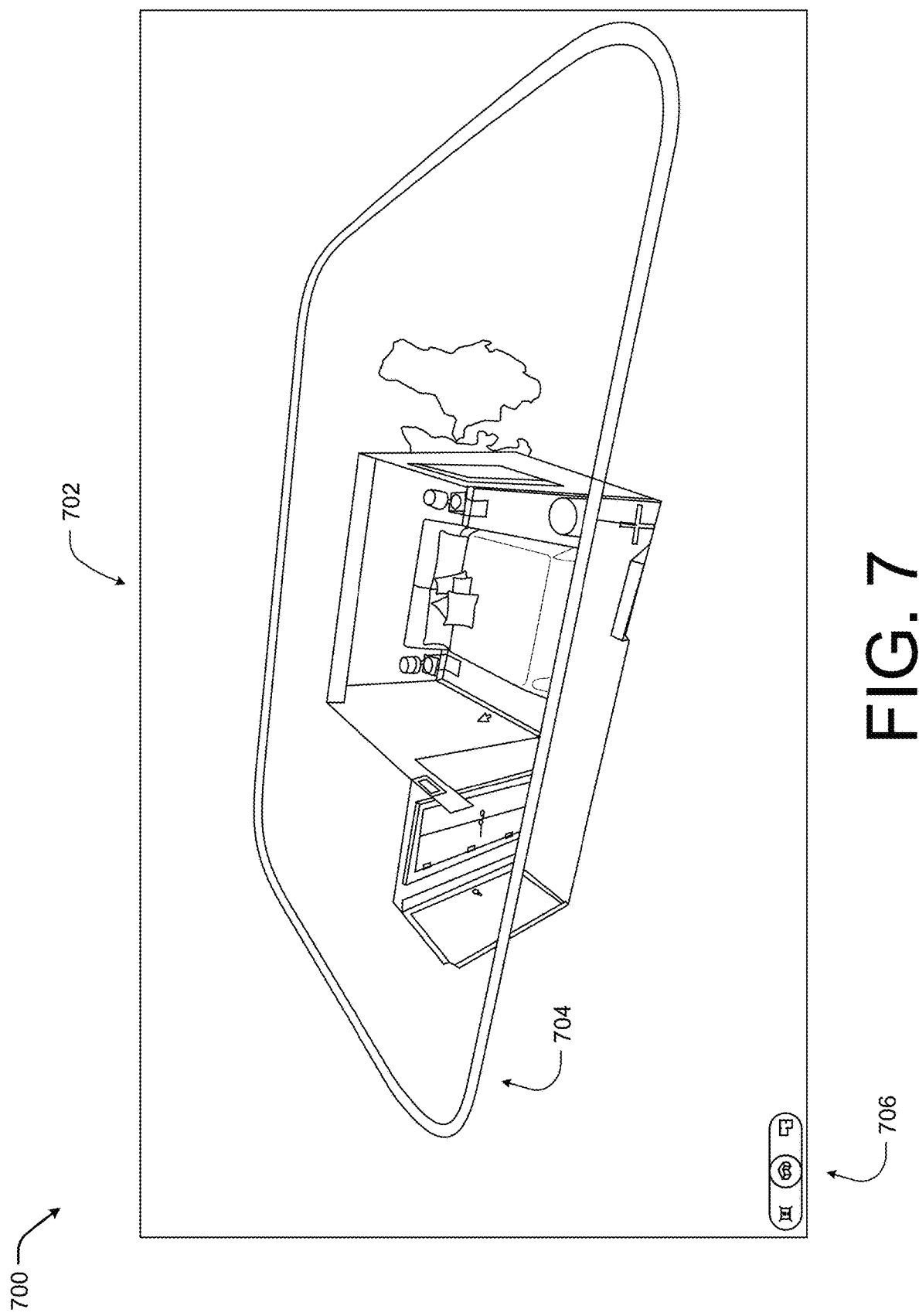
FIG. 7 is another example user interface for viewing a three-dimensional scene of a physical environment according to some implementations.

FIG. 7 is another example user interface for viewing a three-dimensional scene of a physical environment according to some implementations. In the current view, the user may be viewing a virtual bird's eye view model 702 as a three-dimensional scene. The virtual bird's eye view model may be similar to the CAD model of FIG. 6, however representing the colors, textures, and surfaces within the scene.

In the current example, a vertical clipping plane 704 may be displayed around the bird's eye view model 702. The vertical clipping plane 704 may be manipulated by the user to present a cross section of the model 702. For example, as the user moves the vertical clipping plane 704 up and down, the system may display only the portion of the bird's eye view model 702 below the vertical clipping plane 704. In this manner the user may remove obstructions, such as ceilings, hanging lights, furniture, and the like from view. For instance, by moving the vertical clipping plane 704 down to the floor, the system may reveal the floor without any furniture or other objects obstructing the user's view.

In some examples, the system may automatically position the clipping plane 704 based on the model (e.g., size, position, orientation, and the like). For example, the system may recognize the ceiling (either from a scan using computer vision or by knowing types of element the model) and different floors and align the clipping plane 704 based on the detected ceiling and floors.

In the current example, the clipping plane 704 is positioned in a vertical manner. However, it should be understood, that in other implementations, the clipping plane 704 or an additional clipping plane may be positioned about the bird's eye view model 702 in a horizontal manner, such that the user may move the additional clipping plane to the left and right and/or back and forth to generate additional side view cross sections of the model 702. In this example, the system may also present the user with navigation controls or icons, generally indicated by 706. The navigation icons 706 may allow the user to switch between various types of views including, but not limited to, top-down view, perspective view, and/or interior view.

Figure 8:
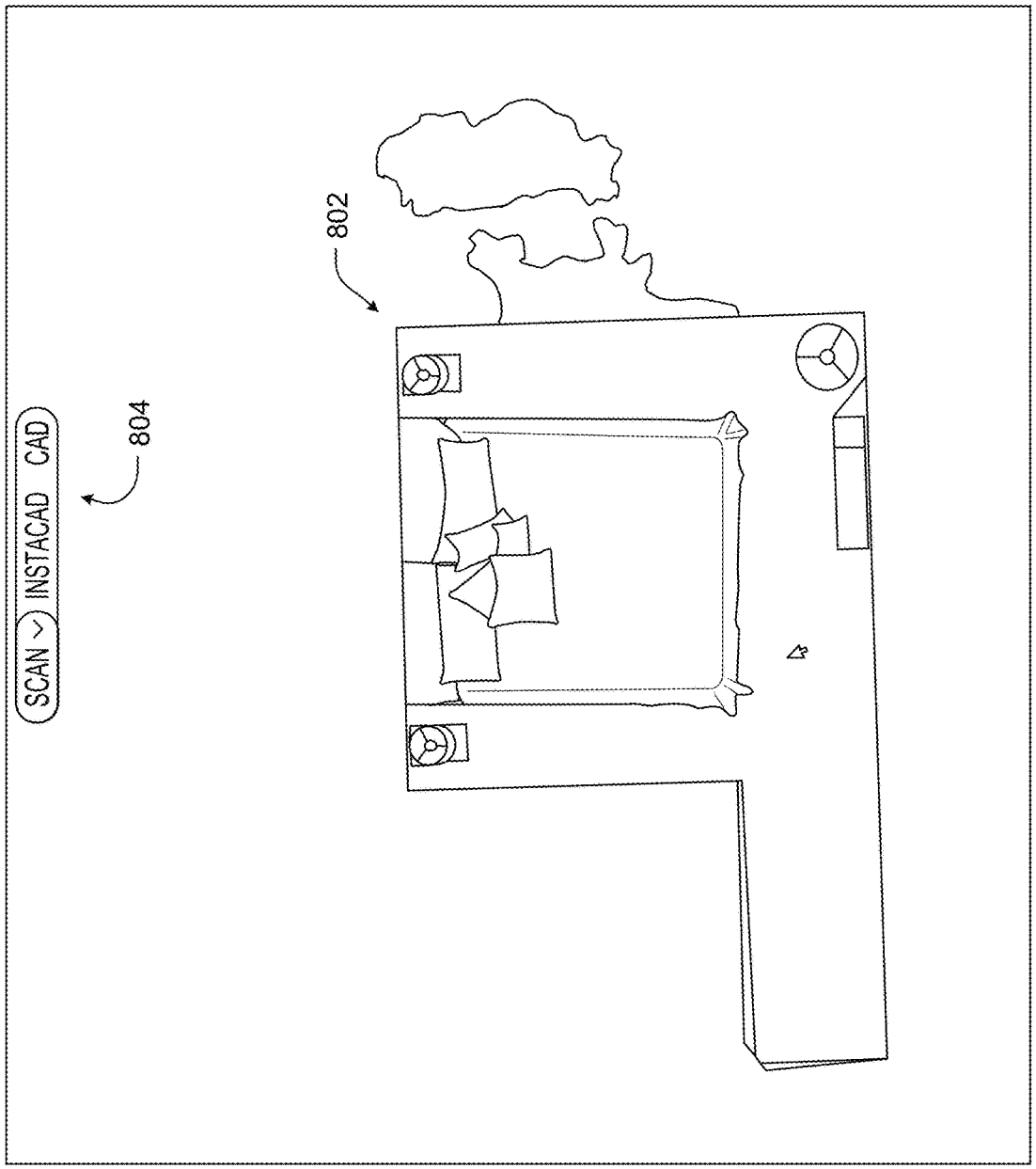
FIG. 8 is another example user interface for viewing a three-dimensional scene of a physical environment according to some implementations.

FIG. 8 is another example user interface 800 for viewing a three-dimensional scene 802 of a physical environment according to some implementations. In the current example, the user may view the model 802 from the top down or bird's eye perspective. In this view, the system may allow the user to quickly determine dimensions such as length and width of the environment represented by the scene 802. In this example, the system may also present the user with model controls or icons, generally indicated by 804. The model controls 804 may allow the user to switch between various types of models including, but not limited to, top-down CAD models, three-dimensional bird's eye view models, virtual environment or scene, point cloud models, and the like.

Figure 9:
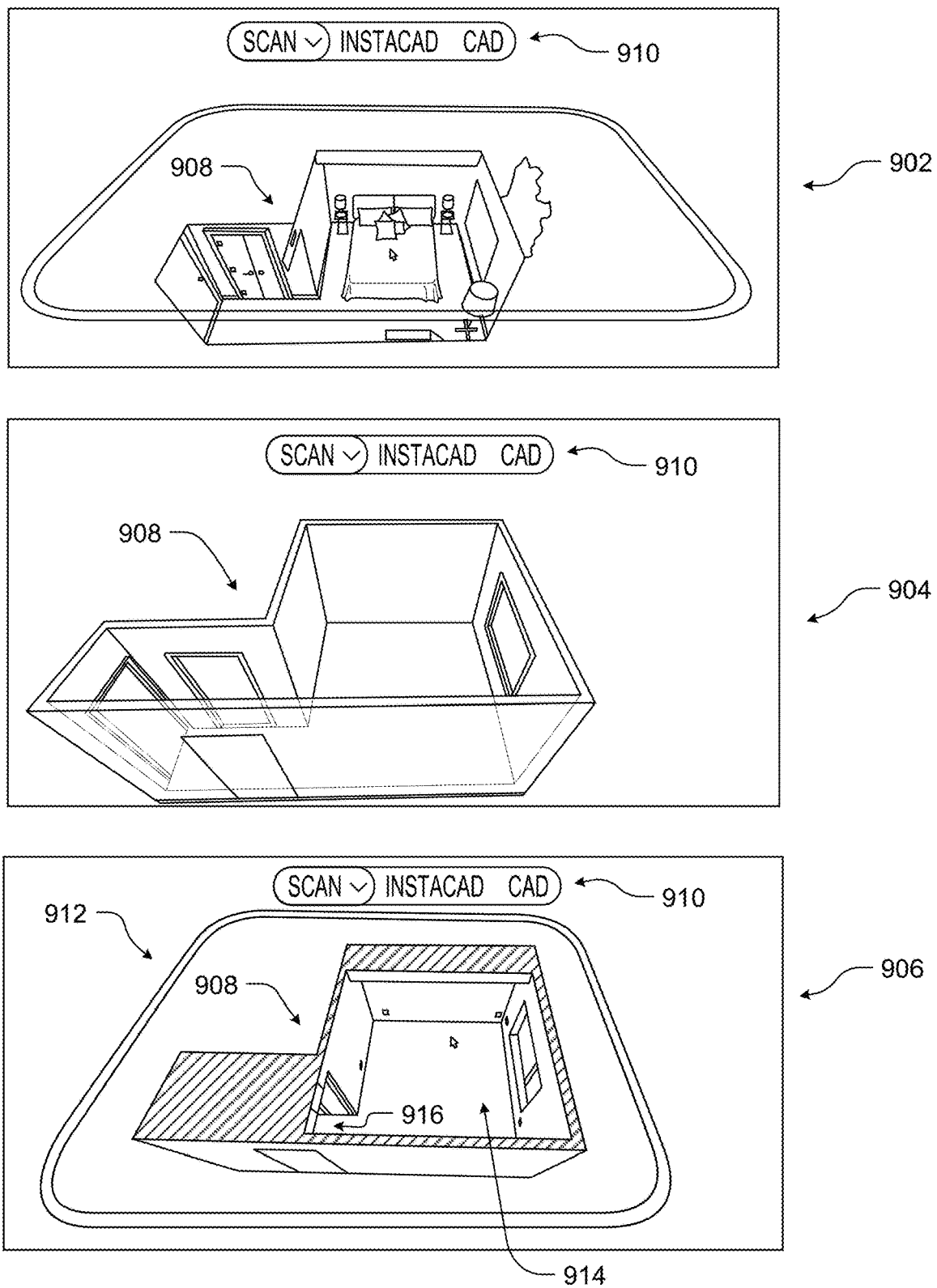
FIG. 9 is an example of multiple views of a user interface for interacting with a three-dimensional scene of a physical environment according to some implementations.

FIG. 9 is an example of multiple views 902, 904, and 906 of a user interface 900 for interacting with a three-dimensional scene 908 of a physical environment according to some implementations. In the current example, the user may first be viewing the scene 908 as a virtual bird's eye view model, such as shown in view 902. The user may then utilize the model controls 910 to transition to a CAD model, shown in view 904. The user may then utilize the vertical clipping plane 912 to reveal that the main room 914 of the scene 908 has a soffit or higher ceiling than the hallway 916. The user may then continue to adjust the vertical reveal of the model using the vertical clipping plane 912 and/or the type of model displayed using the model controls 910.

Figure 10:
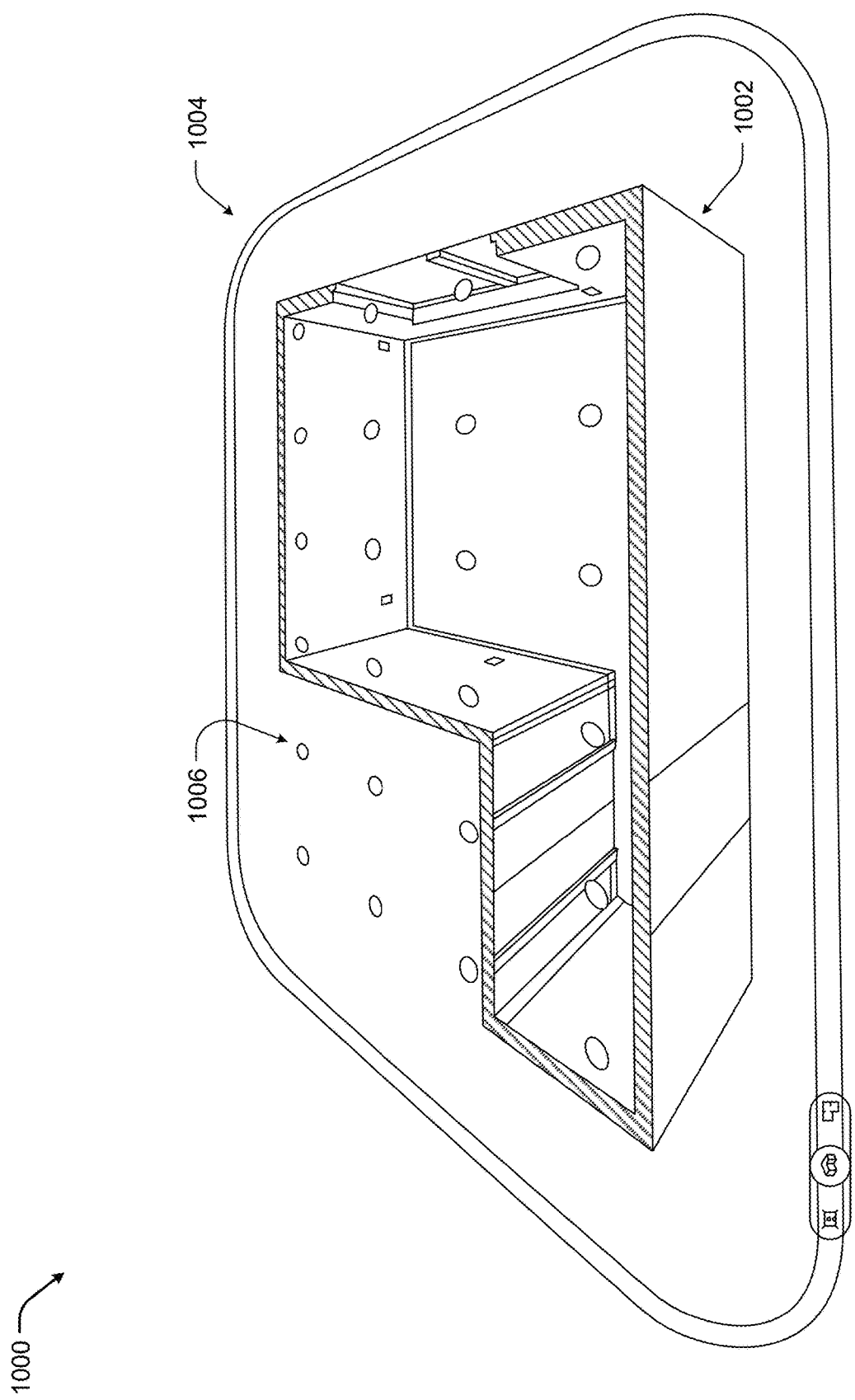
FIG. 10 is another example user interface for viewing a three-dimensional scene of a physical environment according to some implementations.

FIG. 10 is another example user interface 1000 for viewing a three-dimensional scene 1002 of a physical environment according to some implementations. In this example, the user may again be adjusting the vertical reveal of the scene 1002 using the vertical clipping plane 1004. In this example, the user interface 1000 may also include visual indicators, generally indicated by 1006, to assist the user in determining a height or level at which the cross section is currently positioned.

Figure 11:
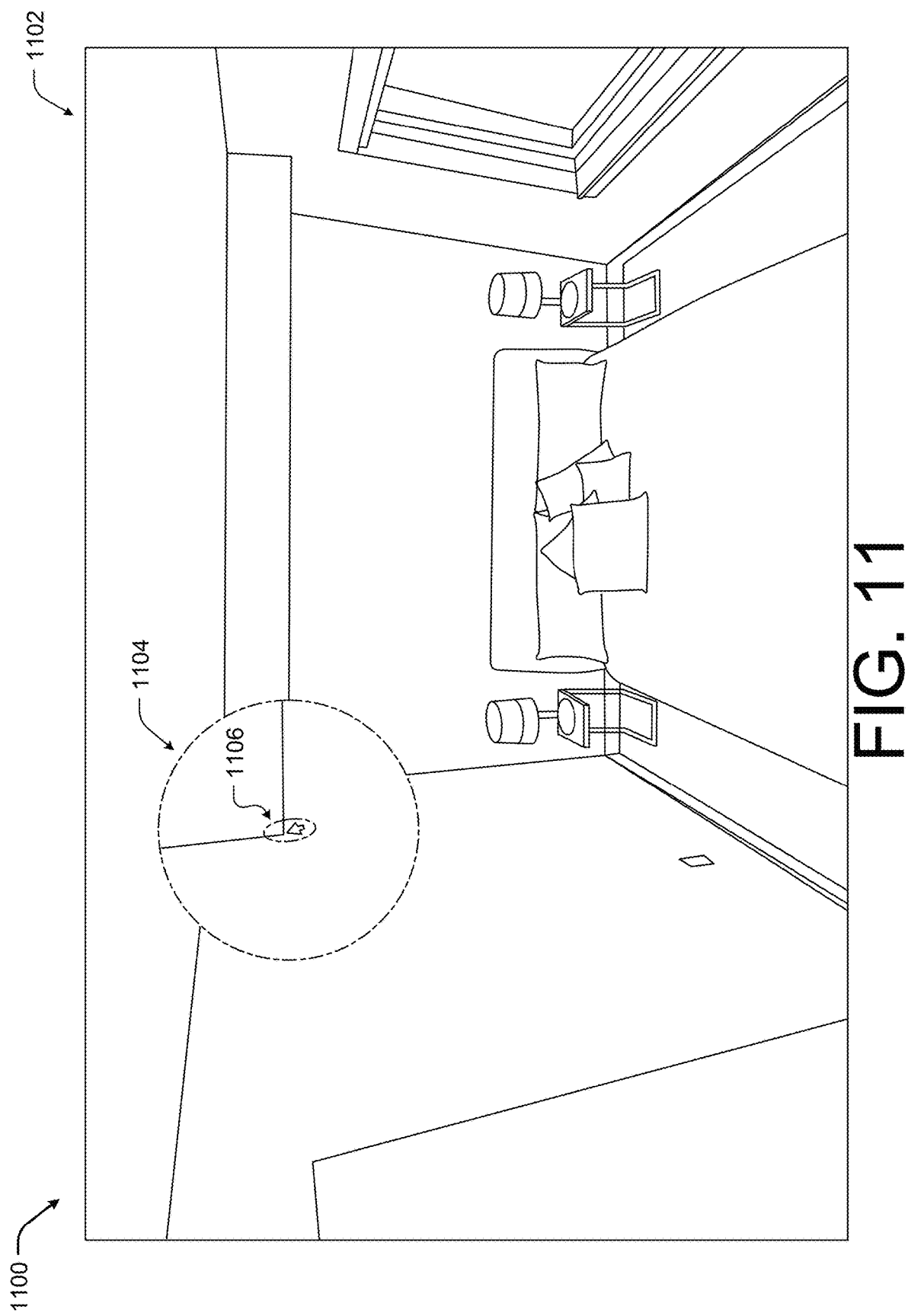
FIG. 11 is another example user interface for viewing a three-dimensional scene of a physical environment according to some implementations.

FIG. 11 is another example user interface 1100 for viewing a three-dimensional scene 1102 of a physical environment according to some implementations. In the current example, the user is viewing the scene 1102 from within the virtual representation. The user is also attempting to select the corner 1106 of the soffit and the adjacent wall as a starting point for a measurement. In this case, to assist the user with making a more precise selection of the corner point, the user interface 1100 is presenting an area or region about the user's initial selection in a magnified view, generally indicated as magnifier 1104. The magnifier 1104 may allow the user to input a second selection or to snap or align the selection with the axis points representing the corner 1106. In some cases, the magnifier 1104 may be positioned about the selection point for a predetermined radius or distance. The user may then move the magnifier 1104 by adjusting a position of the user input device.

Figure 12:
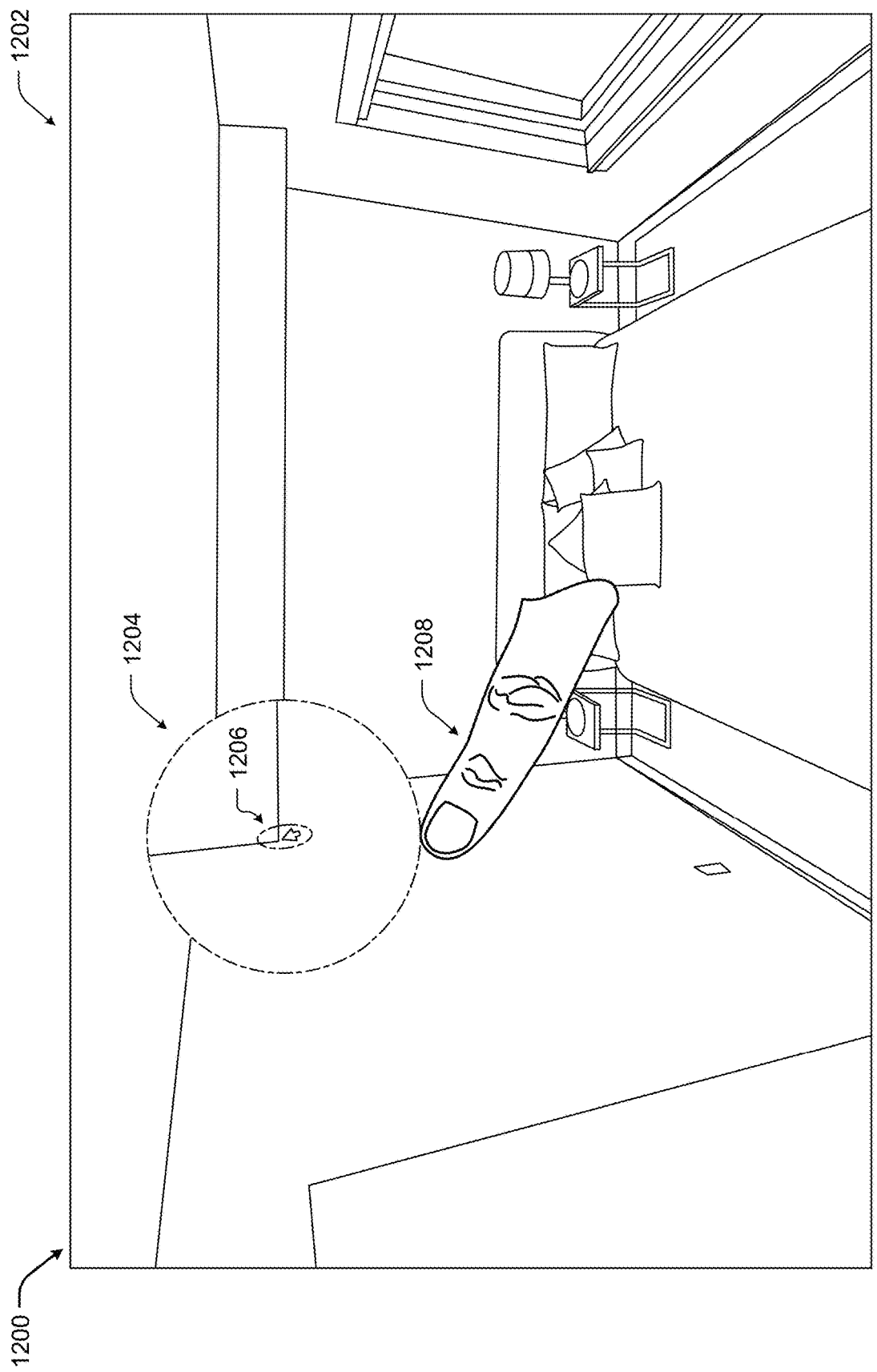
FIG. 12 is another example user interface for viewing a three-dimensional scene of a physical environment according to some implementations.

FIG. 12 is another example user interface 1200 for viewing a three-dimensional scene 1202 of a physical environment according to some implementations. In the current example, the user interface 1200 is again displaying a magnifier 1204. In some cases, the user may be viewing the scene 1202 via a touch screen or touch enabled display. In these cases, the magnifier 1204 may be displayed above (or otherwise adjacent to, e.g., beside, next to, or the like) the user input (e.g., above the finger 1208 of the user) to allow the user to more easily view the magnified region, as the magnified region may otherwise be occluded by the finger 1208. In other cases, when the selection point is too close to the edge of the displayed portion of the model (e.g., adjacent to the edge of the display of the device), the user interface 1200 may display the magnifier 1204 on the display to the right or left of the selection point such that the entire magnified region is visible within the magnifier 1204.

Figure 13:
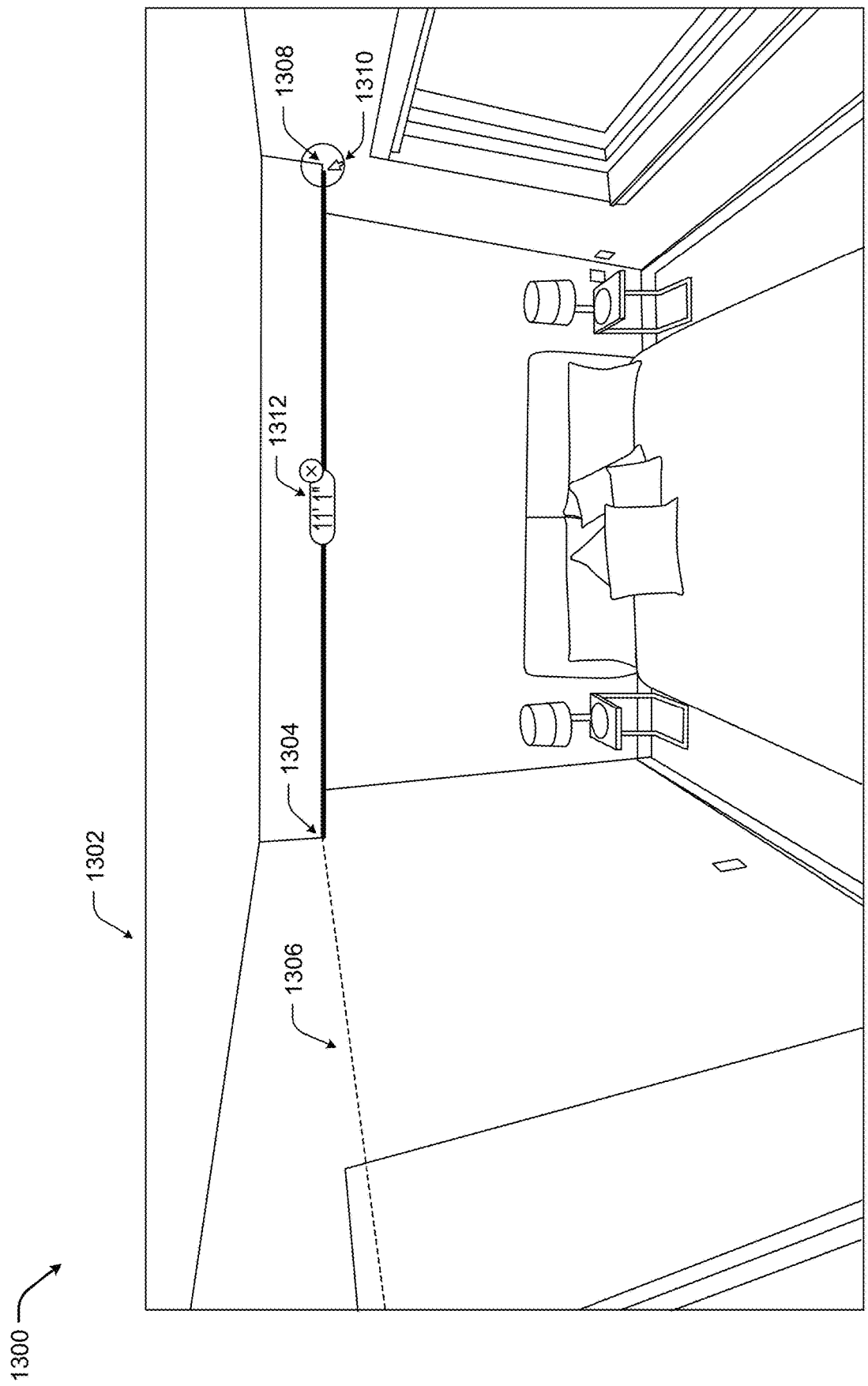
FIG. 13 is another example user interface for viewing a three-dimensional scene of a physical environment according to some implementations.

FIG. 13 is another example user interface 1300 for viewing a three-dimensional scene 1302 of a physical environment according to some implementations. In the current example, the user is viewing the model from within the three-dimensional scene 1302. As discussed above, with respect to FIG. 11, the user may have selected the corner 1304 as a starting point for a measurement. In this example, the system may have presented the dashed line 1306 to the parallel wall as a potential desired measurement. However, in this example, the user may be measuring the length of the soffit from the corner 1304 to the corner 1308. In this example, as the user moves the selection (e.g., the mouse 1310) towards the corner 1308, the user interface 1300 may display the distances, as measurement 1312. In this manner, the measurement 1312 may adjust until the user enters a final selection point, such as via a magnifier as discussed above with respect to FIGS. 11 and 12.

Figure 14:
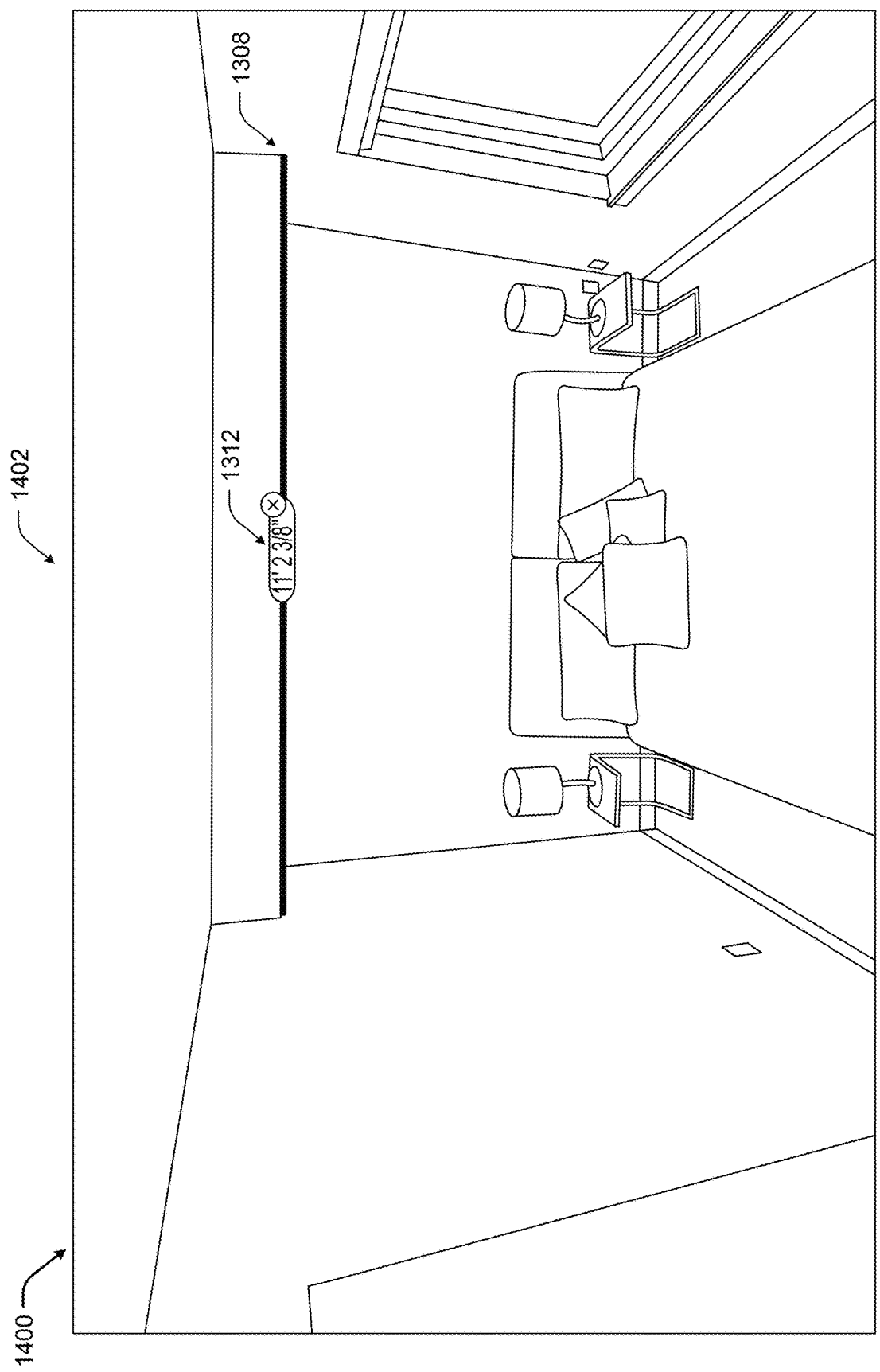
FIG. 14 is another example user interface for viewing a three-dimensional scene of a physical environment according to some implementations.

FIG. 14 is another example user interface 1400 for viewing a three-dimensional scene 1402 of a physical environment according to some implementations. In the current example, the user may have input a final selection point with respect to the measurement 1312 of FIG. 13. In this example, once the user enters the final selection point (e.g., corner 1308), the measurement 1312 may be fixed and no longer adjust as the user moves the selection point or mouse 1310. In some cases, the line 1404 representing the measurement 1312 may change styles, colors, or the like to indicate the measurement 1312 is complete. For example, the line 1404 may transition from a dashed line to a solid line or the line 1404 may change from blue to yellow.

Figure 15:
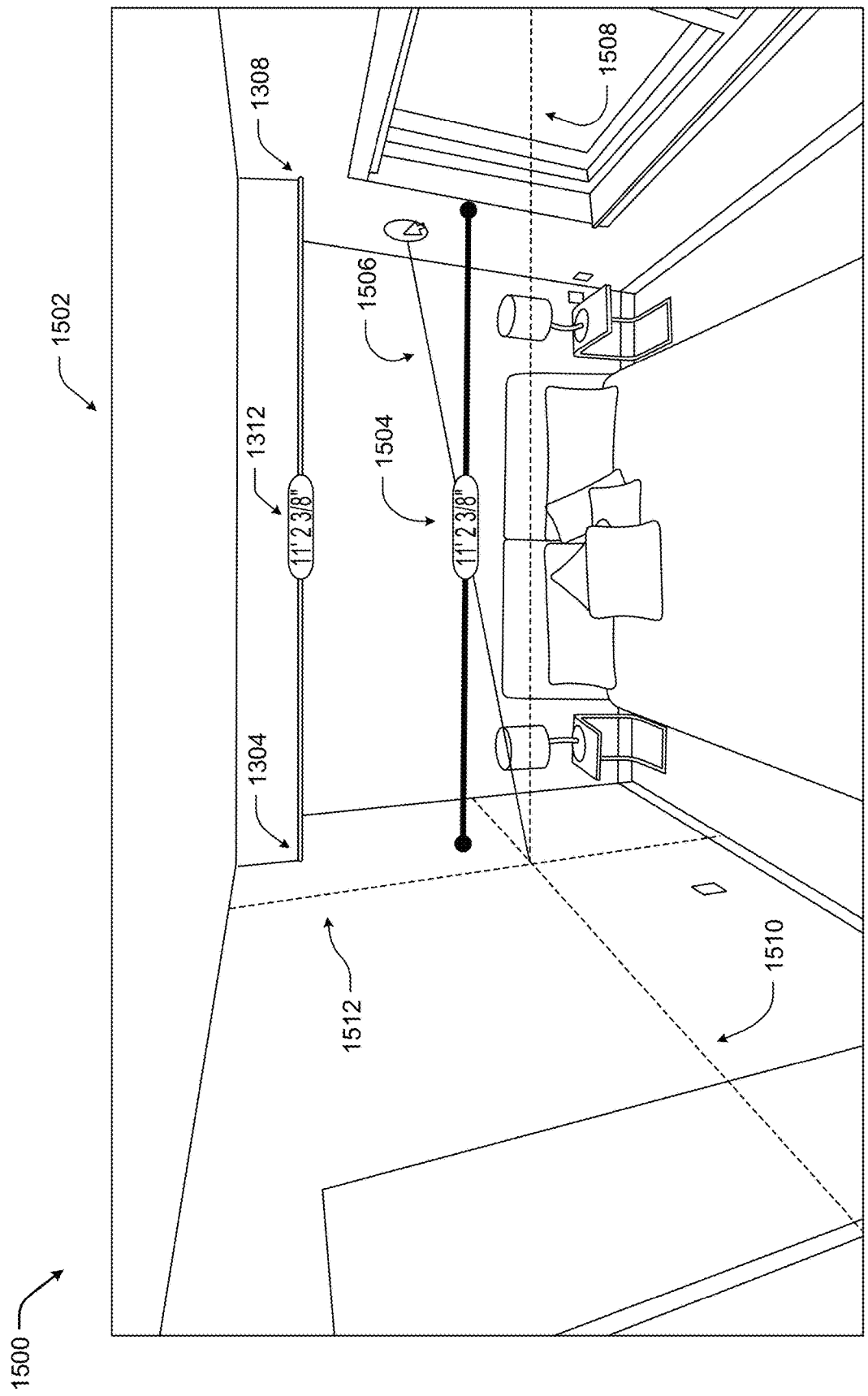
FIG. 15 is another example user interface for viewing a three-dimensional scene of a physical environment according to some implementations.

FIG. 15 is another example user interface 1500 for viewing a three-dimensional scene 1502 of a physical environment according to some implementations. In this example, the user has completed the measurement 1312 as discussed above and has initiated a capture of a second measurement 1504. The measurement 1312 was discussed as a point to point measurement (e.g., the corner 1304 to the corner 1308). In this example, the second measurement 1504 may represent a plane to plane measurement between parallel walls, as shown.

In some examples, a color or style of a measurement line may represent a type of measurement. For instance, a height may be represented as a red line while a length or width may be represented as a blue line. In another example, a point to point measurement may be represented as yellow and the plane to plane measurement may be represented as green. In this example, the plane to plane measurement 1504 also includes circles along each plane whereas the point to point measurement 1312 does not.

Additionally, the system may determine other measurements that may be of interest to the user based on the selected planes, points, currently displayed measurements, and/or current pointer position. For example, the system may generate the lines 1506-1512. The user may then select the displayed lines 1506-1512 to cause the system to display a corresponding measurement.

Figure 16:
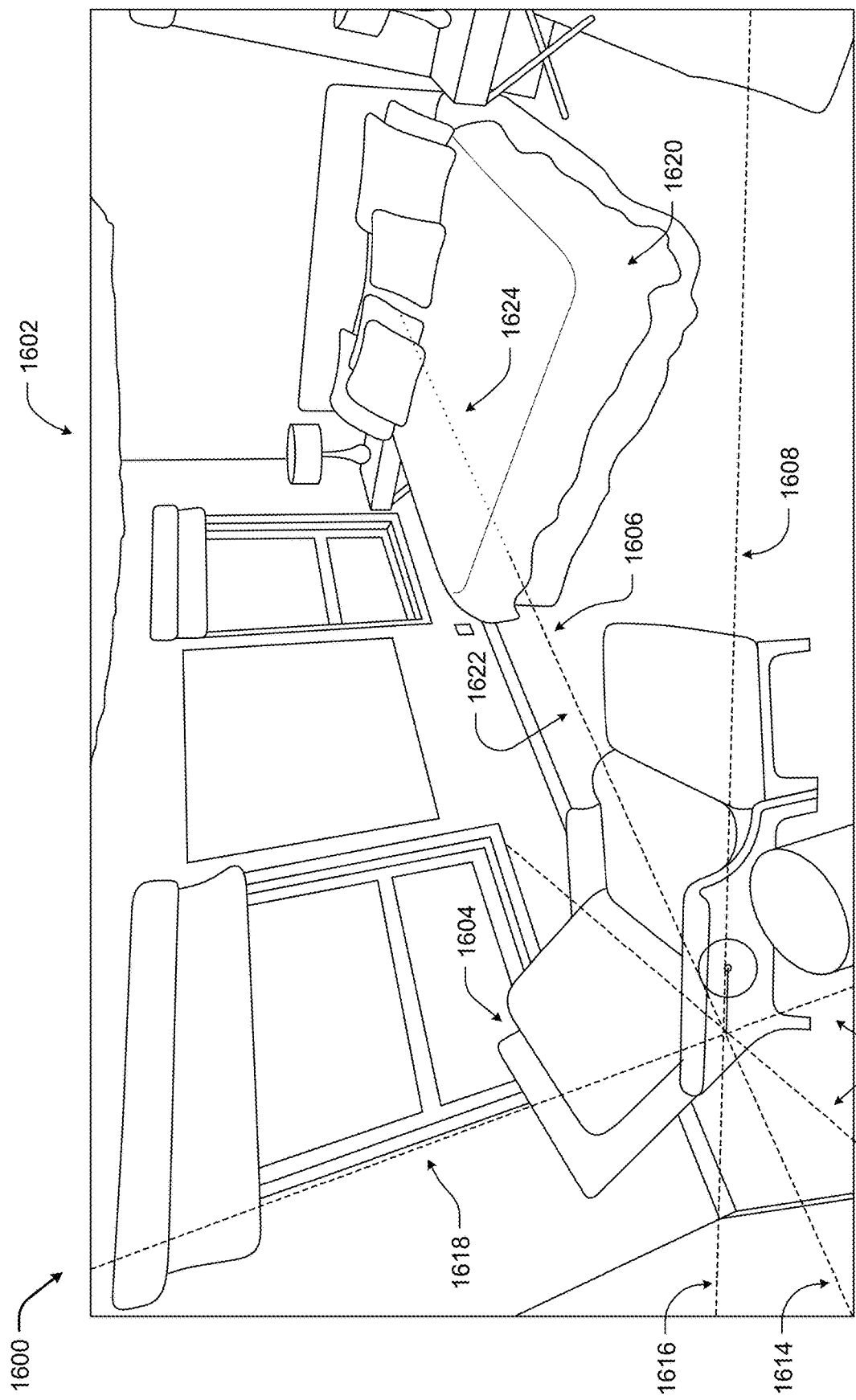
FIG. 16 is another example user interface for viewing a three-dimensional scene of a physical environment according to some implementations.

FIG. 16 is another example user interface 1600 for viewing a three-dimensional scene 1602 of a physical environment according to some implementations. In the current example, the user may be interested in determining a measurement with respect to an object 1604 (e.g., the chair) positioned within the physical environment and represented within the scene 1602. In this example, the user interface 1600 may display various lines 1606-1618 illustrating various potential measurements based on a local axis, plane, and/or normals associated with the selected surface of the object 1604 within the scene 1602. The user interface 1600 may also display multiple measurement selections along the same line. For example, the line 1606 may interest a second object 1620 (e.g., the bed). The line 1606 may be shown in two styles, the first for the portion 1622 that represents the distance between the selected position and the second object and the second for the portion 1624 representing the distance from the intersection of the line 1606 with the bed to the wall. In this example, local axes, planes, and normals are used to recommend measurements. However, it should be understood that in other examples, the user interface 1600 may also utilize global axes, planes, and/or normals when determining the suggested or recommended measurements.

In some examples, when the user taps (or otherwise inputs) the first point of a measurement, the system may determine local axes (e.g. one axis that extends upward, another axis that is the normal to the surface of this first point, and third axis that is orthogonal to the first two axes in a manner in which each axes intersects the first measurement point). In some cases, the system may illustrate the axes, for instance, in response to the user selecting or causing a snap to the illustrated axis liens 1606-1618. For instance, when the user places and moves the second point (not shown), the system may determine or confirm that the second point lies within a threshold distance of an axis (either in 2D and/or 3D), and if the second point is not within the threshold distance, the system may project or move the second point to this axis. In this manner, the user is able to accurately place the second point along the axis without a precise clicks. In other examples, the second point is greater than the threshold (e.g., the second point is not close enough to the axis), then the second point does not snap. In some cases, an axis may intersect a portion of the model or scene that include a hole (e.g., an area of the scene lacking input data). In these cases, the system may automatically adjust the position of the axis to measure a distance between the two surfaces at which the scene is complete on both ends of the measurements.

Figure 17:
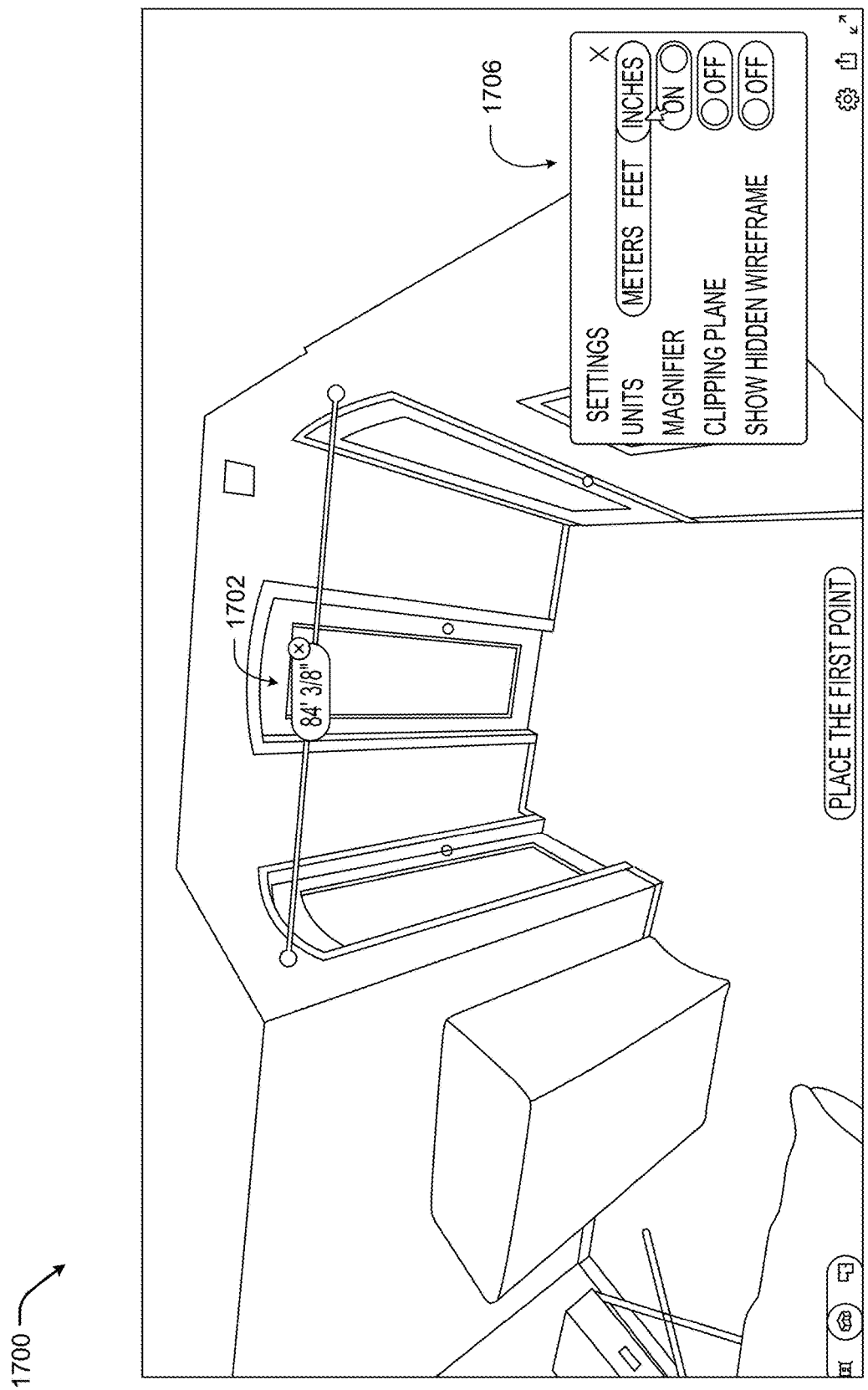
FIG. 17 is another example user interface for viewing a three-dimensional scene of a physical environment according to some implementations.

FIG. 17 is another example user interface 1700 for viewing a three-dimensional scene 1702 of a physical environment according to some implementations. In the current example, the user has generated a plane to plane measurement 1704. In this example, a measurement control window 1706 may be displayed with respect to the measurement 1704 and/or other measurements associated with the scene 1702. In the illustrated example, the user interface 1700 may allow the user to select the type of units (e.g., metric, imperial, and the like), activate and deactivate the magnifier discussed above with respect to FIGS. 11 and 12, activate and deactivate automatic plane and/or point selection, and the like.

Figure 18:
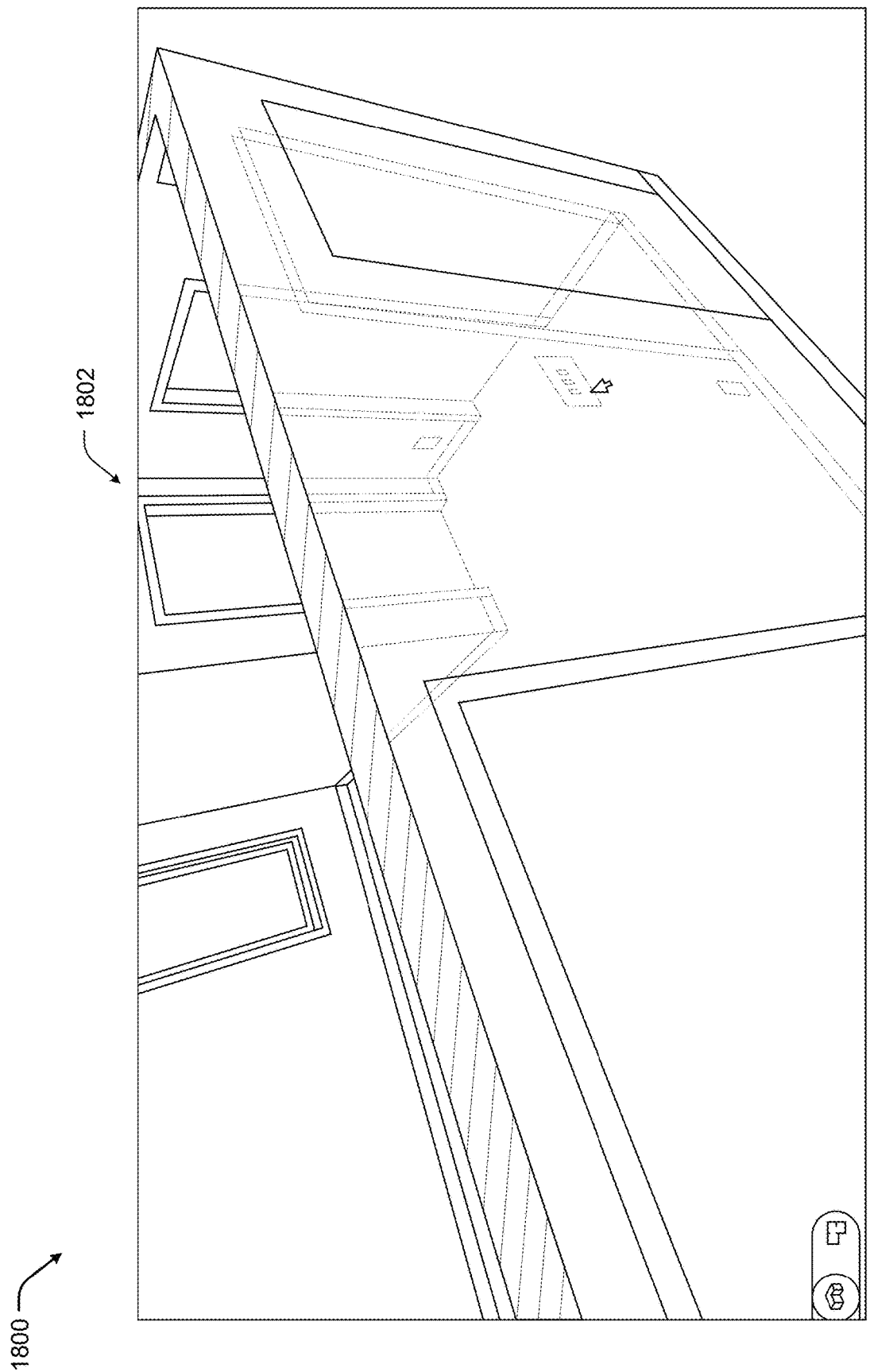
FIG. 18 is another example user interface for viewing a three-dimensional scene of a physical environment according to some implementations.

FIG. 18 is another example user interface 1800 for viewing a three-dimensional scene 1802 of a physical environment according to some implementations. In this example, the user is viewing the scene 1802 as a CAD model. The user interface 1800 may allow the user to set a transparency associated with the CAD model. For example, the user may view an outline of the structure of the objects, walls, and elements of the scene 1802 through the exteriors of the CAD model as shown. As another example, if the user desires to view both a scan and a CAD model concurrently, the user may set transparency for either or both of models.

Figure 19:
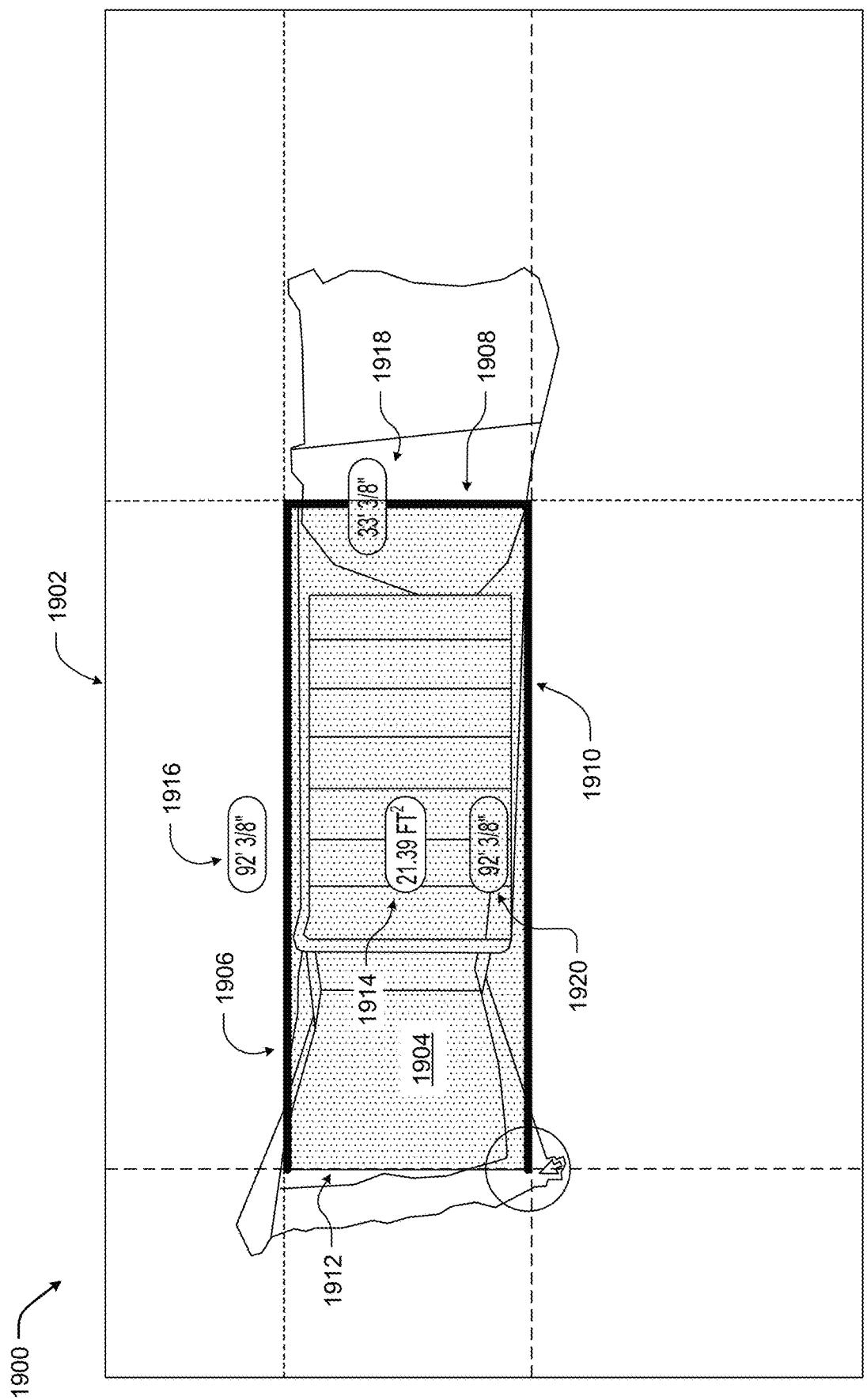
FIG. 19 is another example user interface for viewing a three-dimensional scene of a physical environment according to some implementations.

FIG. 19 is another example user interface 1900 for viewing a three-dimensional scene 1902 of a physical environment according to some implementations. In this example, the user may be viewing a top-down view of a three-dimensional model. As illustrated, the user may trace a region, generally indicated by 1904, and defined by user generated lines 1906-1910 and system generated line 1912. In this example, the user interface 1900 may display measurements 1914-1920 associated with the user defined lines 1906-1910 as well as the measurement 1914 associated with the area of the defined region 1904.

Figure 20:
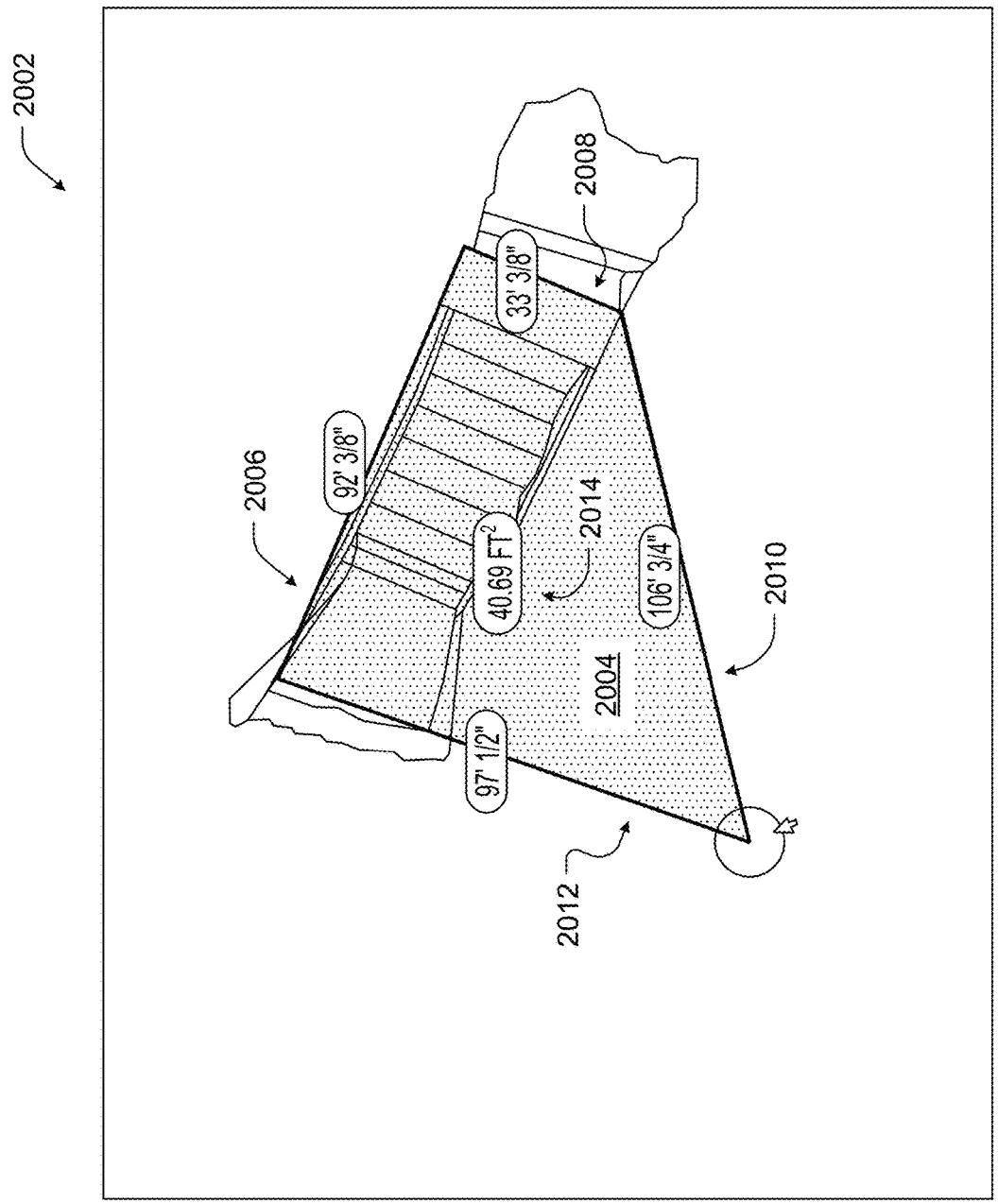
FIG. 20 is another example user interface for viewing a three-dimensional scene of a physical environment according to some implementations.

FIG. 20 is another example user interface 2000 for viewing a three-dimensional scene 2002 of a physical environment according to some implementations. In this example, the user has defined the region 2004 by drawing and connecting lines 2006-2012. The user may then grab and drag the boundary of the region 2004 as shown. As the user adjusts the boundary of the region 2004, the user interface 2000 may determine a plurality of circles within the bounded region 2004, select the largest circle, and maintain the measurement 2014 within the center of the largest circle as the user adjusts the viewpoint. In this manner, the user interface 2000 may adjust in substantially real-time the position of each displayed measurement to ensure that, from a current viewpoint, each of the displayed measurements, including measurements 2014, are visible and not occluded by each other.

Figure 21:
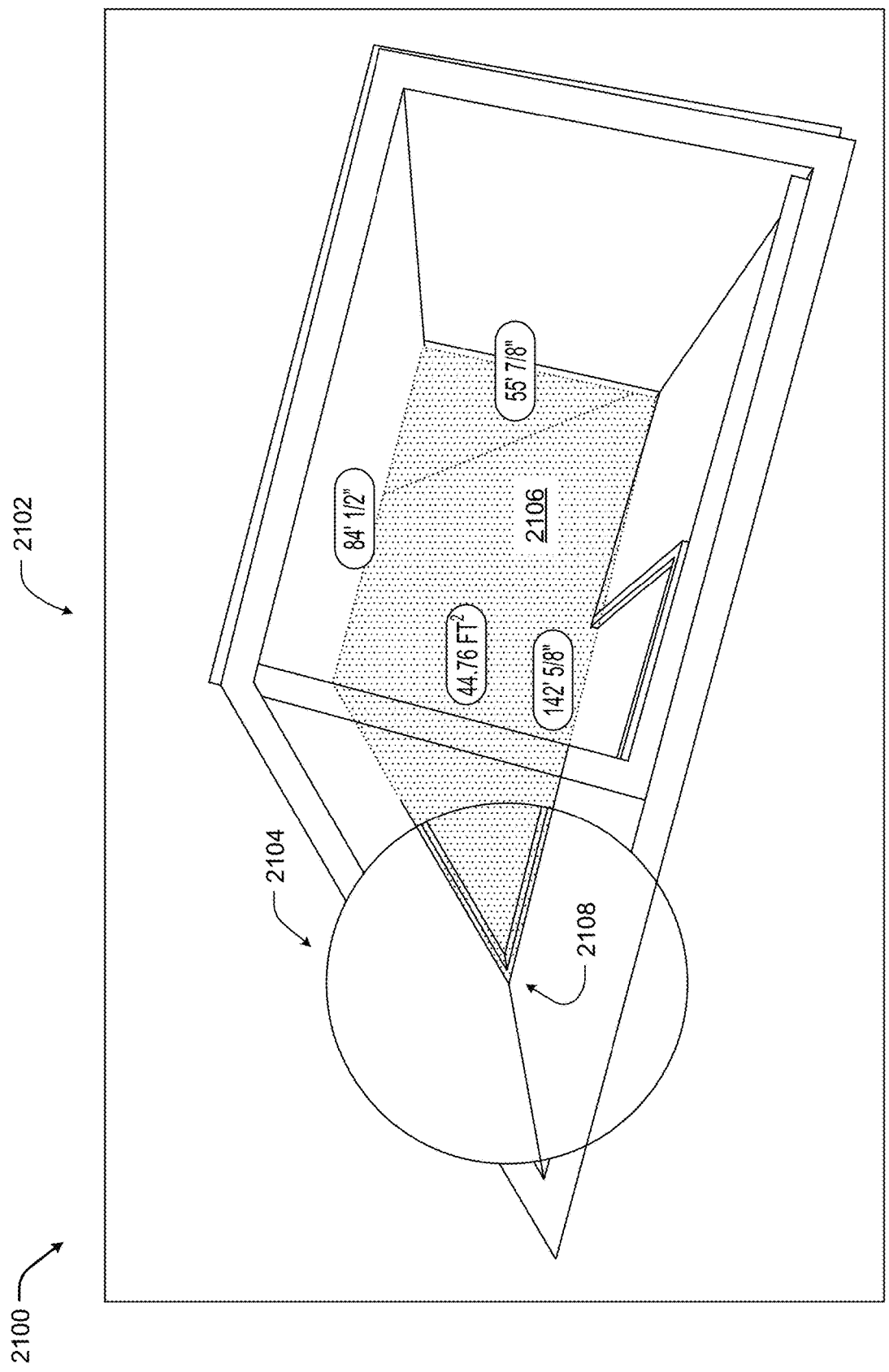
FIG. 21 is another example user interface for viewing a three-dimensional scene of a physical environment according to some implementations.

FIG. 21 is another example user interface 2100 for viewing a three-dimensional scene 2102 of a physical environment according to some implementations. In this example, the user may adjust the structure, surfaces, objects, and planes within the scene 2102 in a manner similar to adjusting the bounded region 2004 discussed above with respect to FIG. 20. As shown, the user has used the magnifier 2104 to select the region 2106 associated with the floor of the room and to adjust the position of the corner 2108, as shown. The user has selected the corner of the room and pulled the corner to the location shown. In this manner, the user may adjust the actual dimensions of the scene 2102 such as when the system's generated dimensions include some amount of error.

Figure 22:
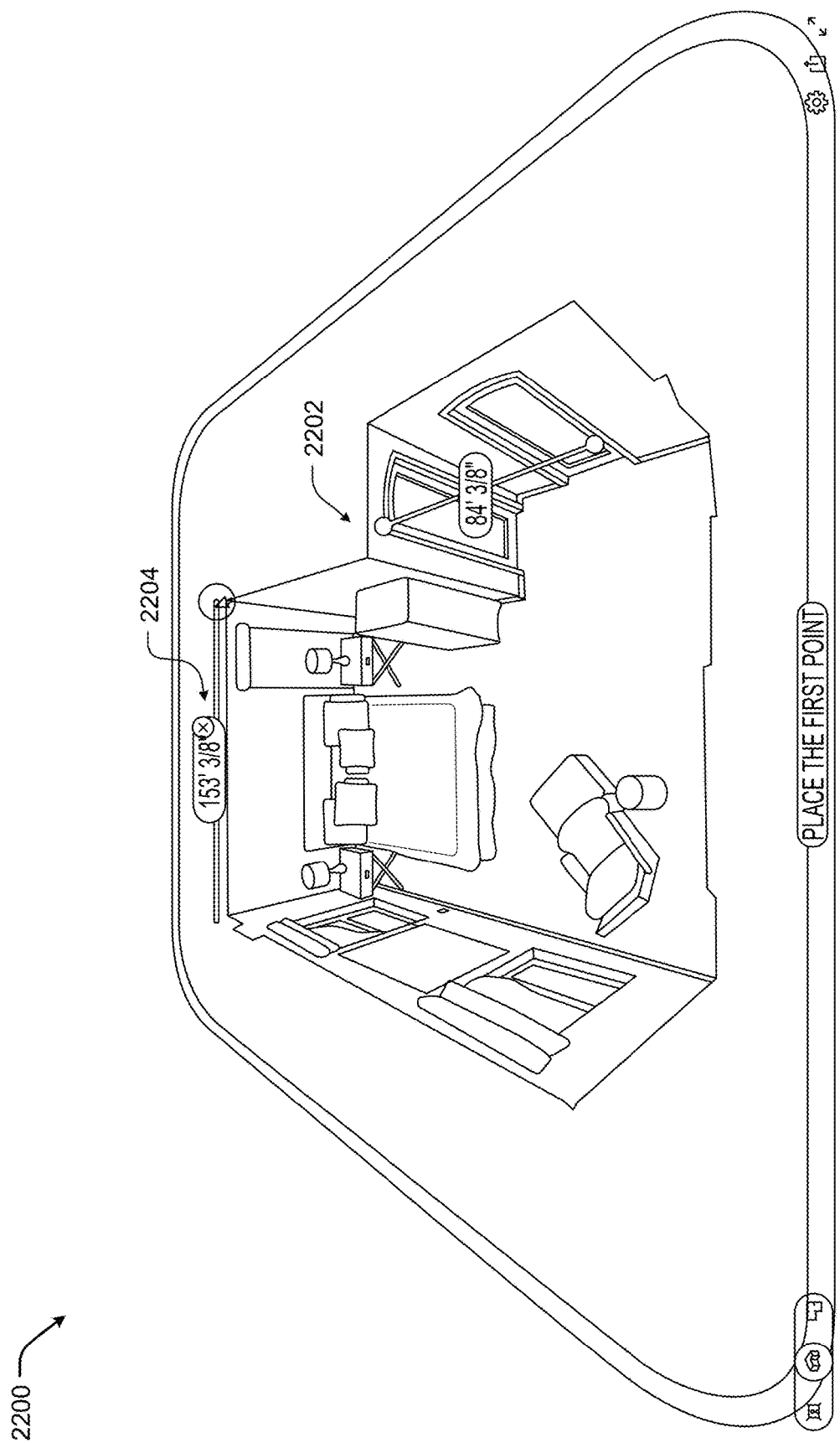
FIG. 22 is another example user interface for viewing a three-dimensional scene of a physical environment according to some implementations

FIG. 22 is another example user interface 2200 for viewing a three-dimensional scene 2202 of a physical environment according to some implementations. In this example, the user may generate measurements, such as measurement 2204, by selecting or drawing lines atop the model, as shown. In this manner, the user interface 2200 may display the measurement 2204 in a manner that is easily visible to the user based on the current viewpoint, does not occlude the model, and provides a visual indication of measured distance, area, or the like.

Figure 23:
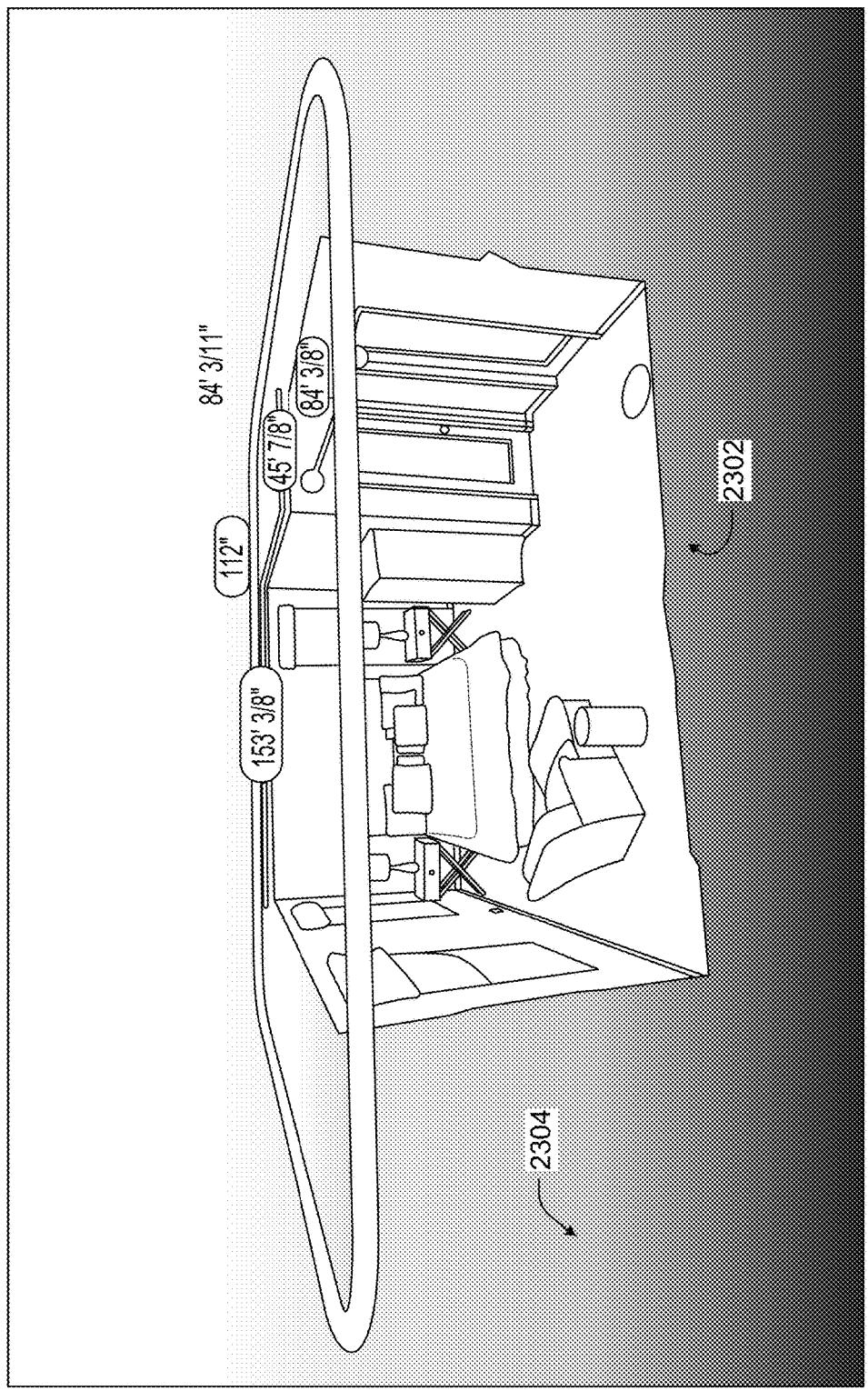
FIG. 23 is another example user interface for viewing a three-dimensional scene of a physical environment according to some implementations.

FIG. 23 is another example user interface 2300 for viewing a three-dimensional scene 2302 of a physical environment according to some implementations. In this example, a background 2304 surrounding the scene 2302 is shown. In some cases, the background 2304 may be formed by a color gradient that is darker proximate to the floor of the scene 2302 and lighter proximate to the top of the scene 2302. In this manner, the background 2302 may assist the user in understanding the dimensions, model position, and the like. In some cases, the system may apply a non-linear correction (such as dithering or adding noise) to the color gradient to present a smooth transition between the intensity of the color in the user interface 2300.

Figure 24:
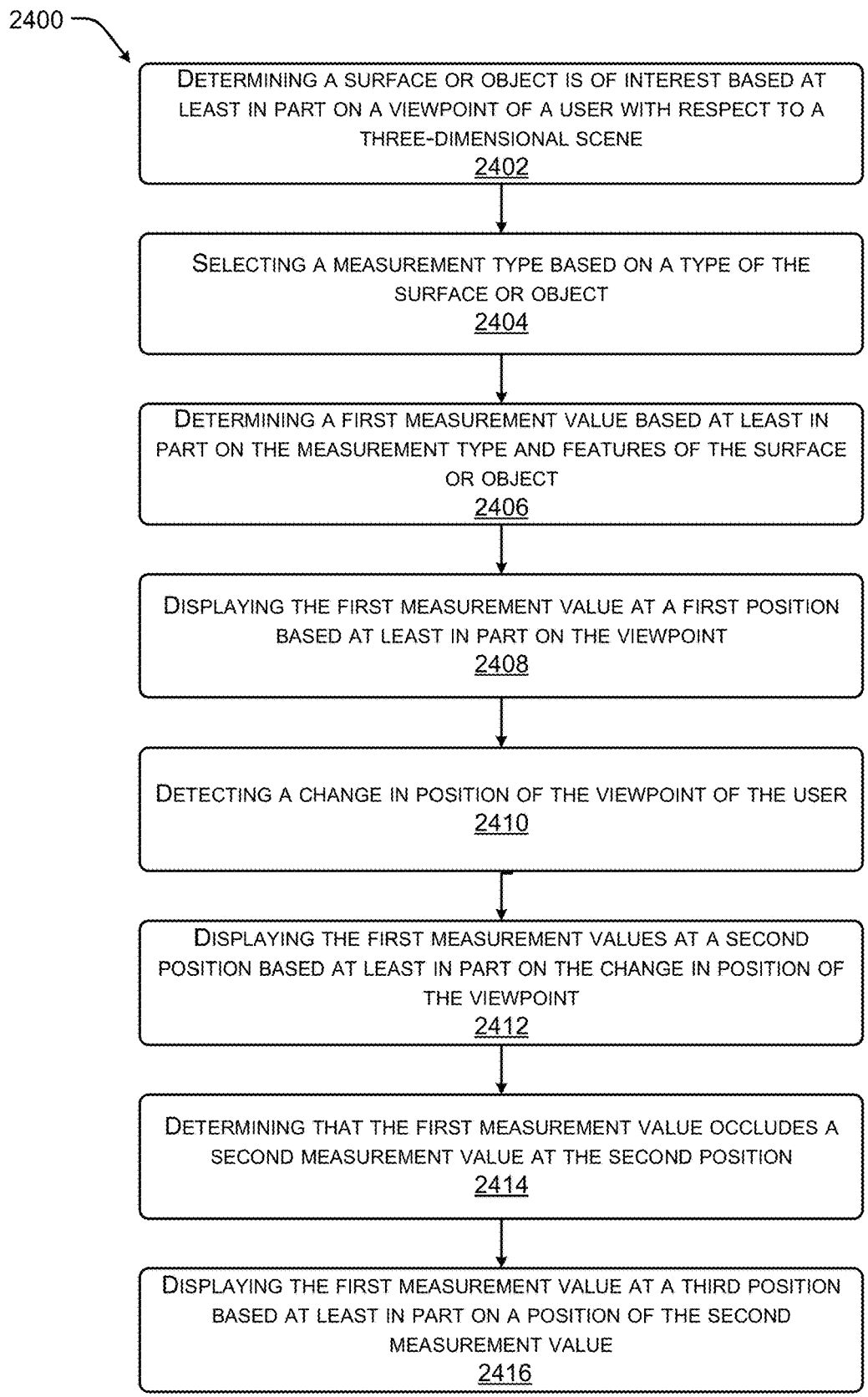
FIG. 24 is an example flow diagram showing an illustrative process for generating measurements associated with a three-dimensional scene of a physical environment according to some implementations.
Figure 25:
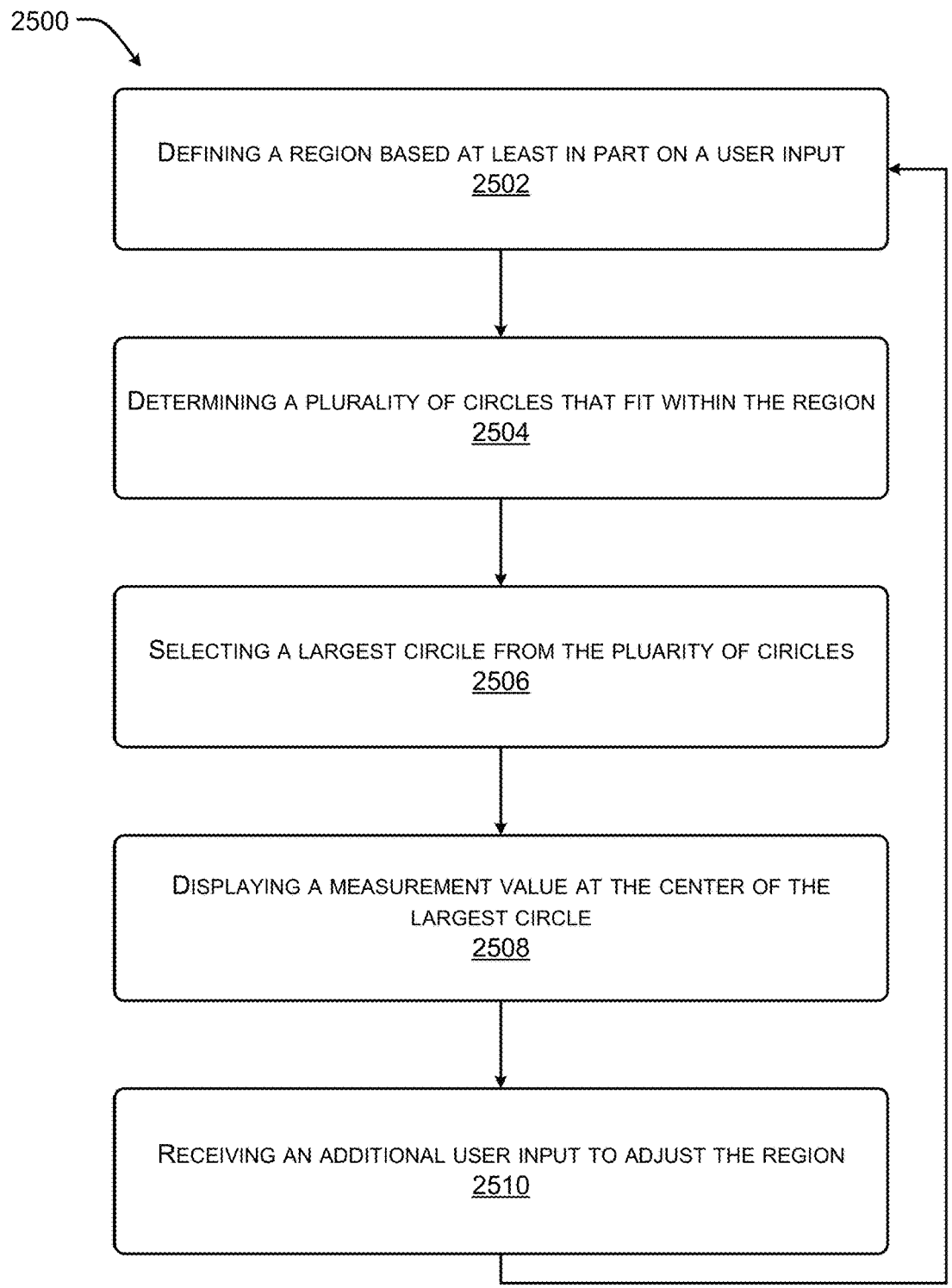
FIG. 25 is another example flow diagram showing an illustrative process for displaying measurements associated with a region of a three-dimensional scene of a physical environment according to some implementations.
Figure 26:
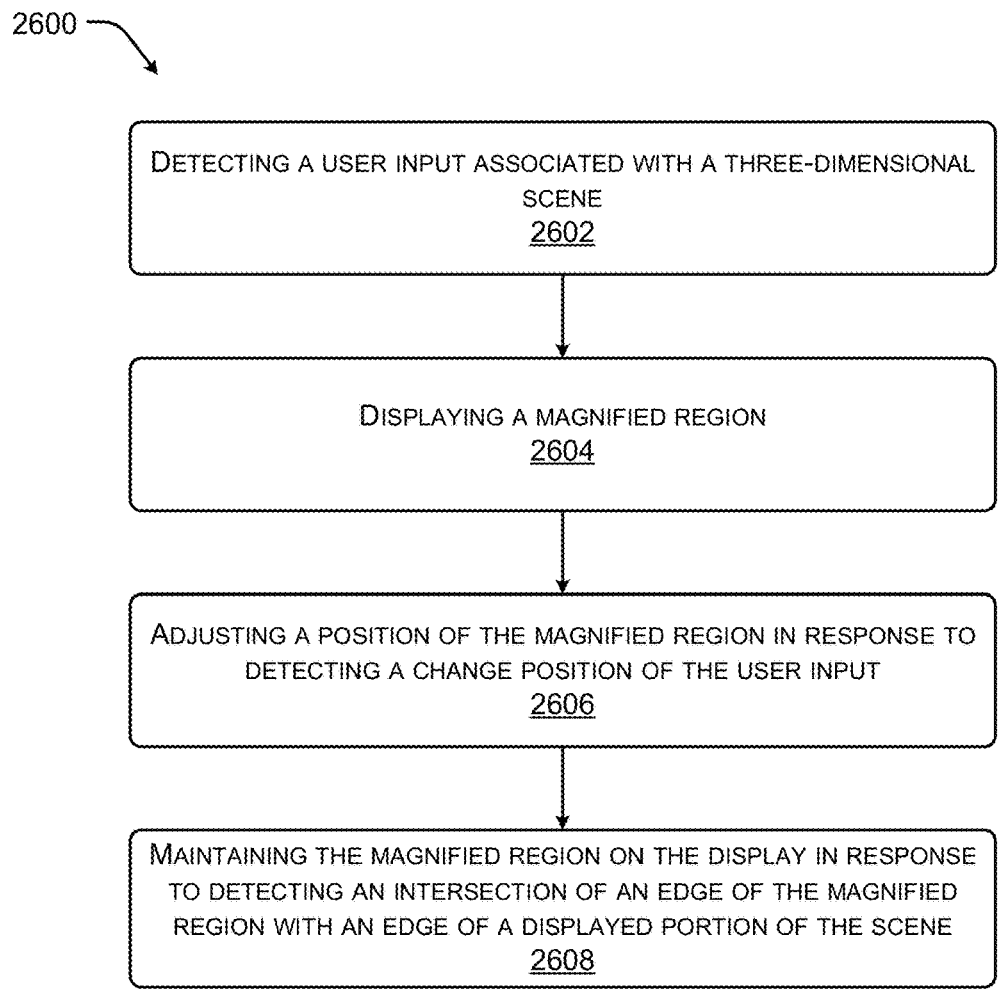
FIG. 26 is another example flow diagram showing an illustrative process for receiving user inputs with respect to a three-dimensional scene according to some implementations.

FIGS. 24-26 are flow diagrams illustrating example processes associated with generating a three-dimensional scene according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

The processes discussed below with respect to FIGS. 24-26 are discussed with respect to a device such as FIG. 27. Further, it should be understood that the processes of FIGS. 24-26 may be used together or in conjunction with the examples of FIGS. 1-23 discussed above.

FIG. 24 is an example flow diagram showing an illustrative process 2400 for generating measurements associated with a three-dimensional scene of a physical environment according to some implementations. As discussed above, a user may utilize the three-dimensional scene to generate accurate and/or precise measurements with respect to the actual physical environment represented by the scene.

At 2402, the system may determine if a surface or object is of interest based at least in part on a viewpoint of a user with respect to the three-dimensional scene. For example, the system may identify a door, window, wall, outlet, object (e.g., furniture), or the like is of interest to the user based on a visible portion of the three-dimensional scene. In some cases, the system may input the visible portion of the three-dimensional scene into one or more machine learned models or networks and receive the surface or objects of interest as the output.

At 2404, the system may select a measurement type based on a type of the surface or object. For example, if the object was a window, the system may select an area, height of the window, width of the window, height of the window from the floor or ground plane, distance of the window to a nearest perpendicular wall or corner, and the like. In another example, if the object is a chair, the system may select a height, width, length or the like of the chair as the measurement. In this example, the system may also select a distance to each wall or other nearby objects. In yet another example, if the object is an outlet the system may select a height from the floor or ground plane, an area of the outlet, length or width of the outlet, distance of the outlet from a nearest wall, and the like. In some cases, the measurement or measurements selected may be learned via one or more machine learned models or networks.

At 2406, the system may determine a first measurement value based at least in part on the measurement type and features of the surface or object. For example, the system may measure a distance to an object, surface, wall or the like and/or an area of the surface or object based on the object of interest and the measurement type selected at 2404. In some cases, when determining a distance, the system may determine a position on the current surface and a position on the corresponding surface. For example, if a surface has variation associated with the depth or uniformity and/or the two surfaces associated with the measurement are not parallel with each other, the system may generate two perpendicular lines, one starting with an endpoint on the first plane and the other starting with an endpoint on the second plane. The system may then average the distance between the two distances to generate the distance presented to the user. In other cases, the system may find the midpoint of the two perpendicularly cast lines and compute the distance between the first plane and the midpoint and the second plane and the midpoint and use the two distances to generate the distance between the first plane and the second plane. In still other cases, the system may compute a center of mass for a segmented region of each plane in order to determine a position of each of the corresponding endpoints. In other cases, the system may cast a perpendicular from the first endpoint to the second endpoint At 2408, the system may display the first measurement value at a first position based at least in part on the viewpoint. For example, the system may select a position on the display for the measurement proximate to the measurement and/or the surface that is not occluded by or occluding other measurement values.

At 2410, the system may detect a change in position of the viewpoint of the user. For example, the user may move or otherwise traverse the three-dimensional scene construction, thereby causing a change in the viewpoint position. For example, the user may move horizontally, rotate about a point, and/or adjust a tilt of the viewpoint.

At 2412, the system may display the first measurement values at a second position based at least in part on the change in position of the viewpoint. For example, the system may select a second position on the display for the measurement proximate to the measurement based on the change in position of the viewpoint and/or the surface and at a location that is not occluded by or occluding other measurement values. As an example, as the viewpoint is moved, various displayed measurement values may occlude each other. As such the system may adjust the position of the displayed measurements values to, for instance, maintain a first distance between the measurement value and the visual representation of the measurement (e.g., the line, lines, boundary, region, or the like) below or equal to a first threshold and maintain a second distance between the measurement value and other displayed measurements above or equal to a second threshold.

At 2414, the system may determine that the first measurement value occludes a second measurement value at the second position and, at 2416, the system may display the first measurement value at a third position based at least in part on a position of the second measurement value. For instance, in the specific example above, the system may adjust the position to maintain the second threshold between the two measurement values.

FIG. 25 is another example flow diagram showing an illustrative process 2500 for displaying measurements associated with a region of a three-dimensional scene of a physical environment according to some implementations. For example, the system may present multiple measurements associated with the three-dimensional scene. In some cases, the system may define areas as measurement values and desire to maintain the area's displayed within the associated bounded region.

At 2502, the system may define a region based at least in part on a user input. For example, the user may completely or partially define a region on the display. For instance, the user may trace lines around an object or surface and the system may present a boundary to the region based on the object or surface dimensions and the portion of the region defined by the user. For instance, if the user selects two sides of a window, the system may define the region as the area associated with the window.

At 2504, the system may determine a plurality of circles that fit within the region. For instance, the system may compute circles within a bounded region based on the current viewpoint. As the viewpoint is changed the system may update and compute additional circles that fit within the region to assist with adjusting the position of the measurement value displayed with respect to the region.

At 2506, the system may select the largest circle for the plurality of circles to use as the circle for displaying the corresponding measurement value and, at 2508, the system may display the measurement evaluation at the center of the largest circle. For instance, the system may then select the largest circle that is not occluded by another measurement value. The system may then display the measurement value within the center of the largest nonoccluded circle. In the current case that the largest circle is occluded, the system may select a second largest circle within the bounded region and display the measurement value at the center of the second largest circle such that each desired measurement is fully visible to the user.

At 2510, the system may receive an additional user input to adjust the region. For instance, the system may define the region as the window, as discussed above, but the user may adjust or move the boundary of the region to define an area associated with the wall including the window. In this case, the process 2500 may return to 2502 and redisplay the measurement value at a new position. In other cases, the user may adjust the viewpoint and again the process 2500 may return to 2502 and redisplay the measurement value.

FIG. 26 is another example flow diagram showing an illustrative process for receiving user inputs with respect to a three-dimensional scene according to some implementations. In some cases, to assist the user in selecting points or providing user inputs, the system may display a magnifier, as discussed above, that allows for more precise user inputs for more precise measurements, such as when the measurement are being used for construction, reconstruction, repair, modification or the like with respect to the physical environment.

At 2602, the system may detect a user input associated with a three-dimensional scene. For instance, the user may be viewing the scene as a bird's eye view, from within the scene, a point cloud, or the like and the user may be entering a selection of a particular point within the scene. In this case, the selection of the particular point may be precise, such as to determine a measurement such as a length, width, or the like.

At 2604, the system may display a magnified region. The magnified region may be about an initial selection point. For instance, the system may display a magnified region at a predefined magnification and with a predefined radius about the initial selection point. In some cases, the system may display the magnified region with respect to the selection point. In other cases, the system may display the magnified region with respect to the user input device. For instance, if the user is engaged with the scene via a touch-enabled display, the user's input device may be a finger or stylus that may be occluding the magnifier if the magnifier was positioned about the initial selection point. In this case, the system may display the magnifier above or to the right of the position if the user input device with respect to the display. In this manner, the magnifier may be positioned such that the magnifier is not occluded by the user's finger or the stylus.

At 2606, the system may adjust the position of the magnified region in response to detecting a change in position of the user input. For instance, the system may detect an intersection between an edge of the magnified region and the user input (e.g., the user has moved the input device—mouse, stylus, finger, etc.) to the edge of the magnified region. In this example, the system may move the magnified region with the user input device until the user selects a final position for the selection point.

At 2608, the system may maintain the magnified region on the display in response to detecting an intersection of an edge of the magnified region with an edge of the displayed portion of the scene. For example, if the user moves the input position to the edge of the display the system may pan or move the display as well as the magnified region. In other cases, if the user moves the input position to the edge of the model or scene the system may move the magnified region, such that the magnified region remains entirely on the display (e.g., that no portion of the magnified region is outside of the display). In some cases, the magnified region may be adjusted based on the edge of the display and the position of the input, such that the magnified region is not off the display and not occluded by the input device (e.g., the stylus, finger, or the like).

Figure 27:
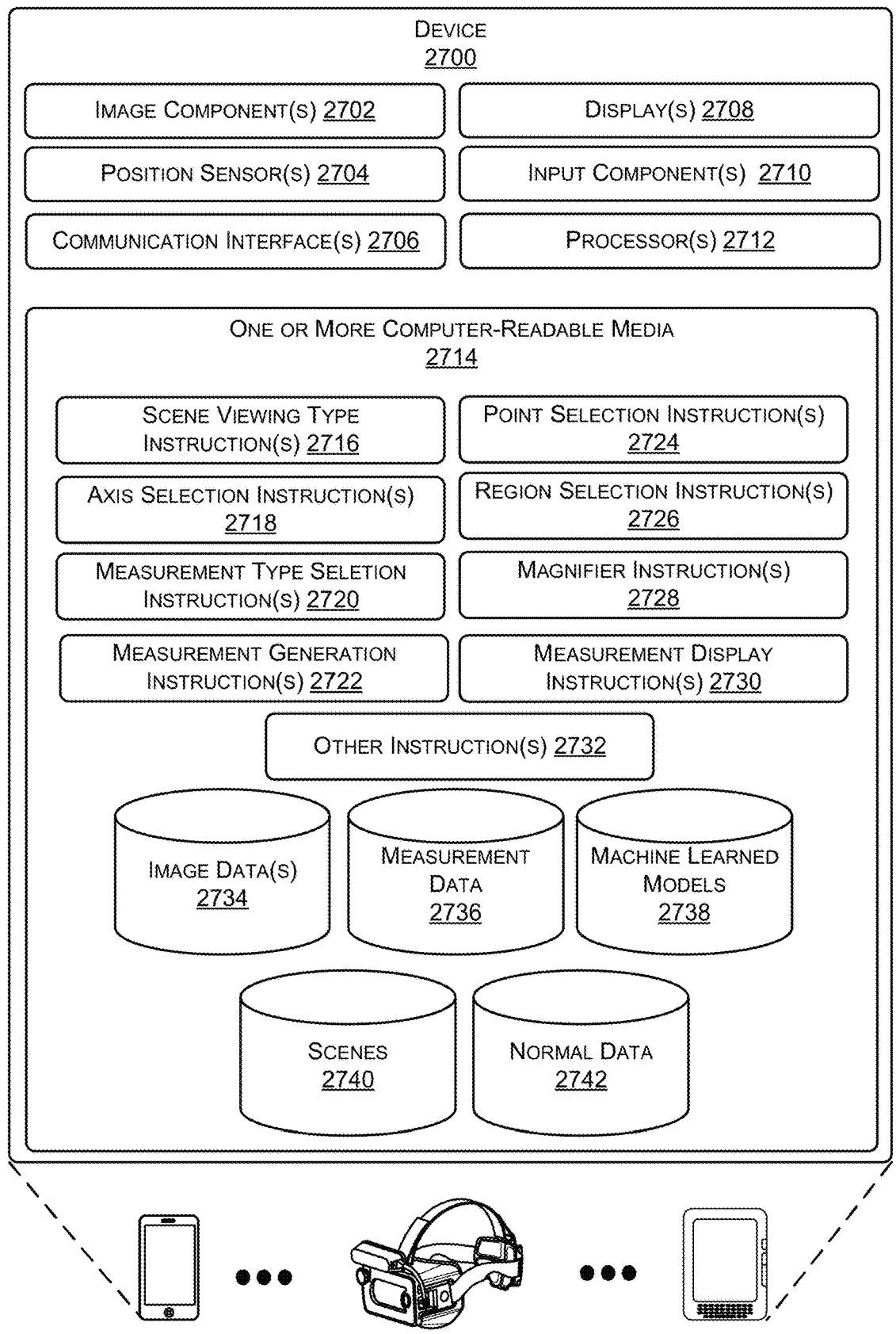
FIG. 27 is an example device associated with consuming a three-dimensional scene according to some implementations.

FIG. 27 is an example device 2700 associated with consuming a three-dimensional scene according to some implementations. As described above, the device 2700 may be used by a user to scan, generate, and/or consume three-dimensional models or scenes associated with physical environments. In the current example, the device 2700 may include image components 2702 for capturing visual data, such as image data, video data, depth data, color data, infrared data, or the like from a physical environment surrounding the device 2700. For example, the image components 2702 may be positioned to capture multiple images from substantially the same perspective (e.g., a position proximate to each other on the device 2700). The image components 2702 may be of various sizes and quality, for instance, the image components 2702 may include one or more wide screen cameras, three-dimensional cameras, high definition cameras, video cameras, infrared camera, depth sensors, monocular cameras, among other types of sensors. In general, the image components 2702 may each include various components and/or attributes.

In some cases, the device 2700 may include one or more position sensors 2704 to determine the orientation and motion data of the device 2700 (e.g., acceleration, angular momentum, pitch, roll, yaw, etc.). The position sensors 2704 may include one or more IMUs, one or more accelerometers, one or more gyroscopes, one or more magnetometers, and/or one or more pressure sensors, as well as other sensors. In one particular example, the position sensors 2704 may include three accelerometers placed orthogonal to each other, three rate gyroscopes placed orthogonal to each other, three magnetometers placed orthogonal to each other, and a barometric pressure sensor.

The device 2700 may also include one or more communication interfaces 2706 configured to facilitate communication between one or more networks and/or one or more cloud-based services, such as a cloud-based services 108 of FIG. 1. The communication interfaces 2706 may also facilitate communication between one or more wireless access points, a master device, and/or one or more other computing devices as part of an ad-hoc or home network system. The communication interfaces 2706 may support both wired and wireless connection to various networks, such as cellular networks, radio, WiFi networks, short-range or near-field networks (e.g., Bluetooth®), infrared signals, local area networks, wide area networks, the Internet, and so forth.

The device 2700 may also include one or more displays 2708. The displays 2708 may include a virtual environment display or a traditional two-dimensional display, such as a liquid crystal display or a light emitting diode display. The device 2700 may also include one or more input components 2710 for receiving feedback from the user. In some cases, the input components 2710 may include tactile input components, audio input components, or other natural language processing components. In one specific example, the displays 2708 and the input components 2710 may be combined into a touch enabled display.

The device 2700 may also include one or more processors 2712, such as at least one or more access components, control logic circuits, central processing units, or processors, as well as one or more computer-readable media 2714 to perform the function associated with the virtual environment. Additionally, each of the processors 2712 may itself comprise one or more processors or processing cores.

Depending on the configuration, the computer-readable media 2714 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 2712.

Several modules such as instruction, data stores, and so forth may be stored within the computer-readable media 2714 and configured to execute on the processors 2712. For example, as illustrated, the computer-readable media 2714 store scene viewing instructions 2716, axis selection instructions 2718, measurement type selection instructions 2720, measurement generation instructions 2722, point selection instructions 2724, region selection instructions 2726, magnifier instructions 2728, measurement display instructions 2730 as well as other instructions 2732, such as operating instructions. The computer-readable media 2714 may also store data usable by the instructions 2716-2732 to perform operations. The data may include image data 2734 such as frames of a physical environment, measurement data 2736, machine learned model data 2738, machine learned model or network data 2740, surface normal data 2742, as discussed above.

The scene viewing instructions 2716 may be configured to allow the user to view the scene or model via various views. For instance, the scene may be viewed as a traversable model (e.g., the user is within the scene), as a three-dimensional bird's eye view model, a CAD model, a top-down layout, a point cloud, and the like. The scene viewing instructions 2716 may also allow the user to transition between viewing and/or model types by selecting various options.

In some cases, the scene viewing instructions 2716 may allow the user to apply vertical and/or horizontal cross sections of the model or scene, remove ceilings, floor, and/or walls from the scene, add or remove furniture or objects from the scene, and the like. In some specific instances, such as when the user is traversing the scene as a virtual environment, the scene viewing instructions 2716 may allow the user to move within a defined boundary, from viewpoint to viewpoint, and the like. In the case of the boundary, the boundary area may be defined without corners or edges to allow a smooth horizontal panning throughout the scene.

In another specific example, if the user is viewing the model or scene, the scene viewing instructions 2716 may render corner lines and/or features in front of walls and an actual physical position to provide a more realistic viewing experience and prevent occluding one wall by the other as the user traverses the scene.

The scene viewing instructions 2716 may also determine a physical area, jurisdiction, or region (e.g., the United States or Canada) associated with the physical environment based at least in part on the style, content, measurement units, objects, and the like of the scene. In some cases, the scene viewing instructions 2716 may change an appearance, background color, theme, or the like of the scene or model based on the determined physical area jurisdiction, or region. In other cases, the scene viewing instructions 2716 may set a time zone associated with the model or scene based on the determined physical area, jurisdiction, or region.

The axis selection instructions 2718 may be configured to select or display various global and local axes based on a selected surface, plane, object, point or the like. For example, the if the user selects the side of a chair, the system may display local axes based on the normal of the selected surface (e.g., the side of the chair) as well as global axes based on the orientation and/or normals of the room or environment. In some cases, the axis selection instructions 2718 may display each of the axes as lines within the scene using in various colors, shading, thickness, textures, types and the like to distinguish each axis. For example, global axes may be in solid lines and local axes may be in dashed lines. In other cases, the axes may be shown as solid until the axes intersect an object in the environment and subsequently (e.g., after the intersection) shown as dashed or broken. In some cases, the user may select an axis to obtain a measurement associated therewith.

The measurement type selection instructions 2720 may be configured to select a type of measurement intended by a user selection. For instance, the measurement type selection instructions 2720 may select a type of measurement (e.g., area, volume, distance, and the like) based on an area or object of interest of the user, a user selection or input (e.g., a selection of a point, surface, and/or object), and the type or class associated with the area or object. As an illustrative example, if the user is viewing a painting on the wall, the measurement type selection instructions 2720 may select a distance to the floor as a first measurement type and an area of the painting as a second measurement type. In some cases, the measurement type selection instructions 2720 may select a predetermined number of measurement types, such as two, three, four, five, etc.

The measurement generation instructions 2722 may be configured to determine the value of the selected measurements and/or measurement types. For example, if the user selects two points, planes, surfaces, or the like, the measurement generation instructions 2722 may determine a distance between them. In some cases, the measurement generation instructions 2722 may also determine a total distance associated with a chain of lines or measurements selected by the user, such as if the user defines a region about a doorway or the like. In this manner, the measurement generation instructions 2722 may combine measurements to generate both individual distances such as height and width of the doorway as well as a total exterior length of the doorway and/or area within the defined region.

The point selection instructions 2724 may be configured to assist the user in selecting a desired point and generating accurate measurements. For instance, if the user selects a position within a predefined distance (such as a pixel distance) from a corner or edge, the point selection instructions 2724 may cause the user's selection to snap or otherwise align with the corner or edge. In some cases, the point selection instructions 2724 may allow the user to enable and disable the snap to axis, corner, intersection and the like.

The region selection instructions 2726 may be configured to select a region of the scene for the user. For example, if a user selects a wall, the region selection instructions 2726 may outline the wall and/or features, such as light switches, outlets, paintings, and the like associated with the wall. In this manner, the user may select with a single click the desired region, thereby preventing the user from having to outline or define the entire area.

The magnifier instructions 2728 may be configured to present a magnified region about an initial selection point for the user to assist with more precise point selection and more accurate measurements. For instance, the magnifier instructions 2728 may display a magnified region at a predefined magnification and with a predefined radius about the initial selection point. In some cases, the magnifier instructions 2728 may display the magnified region with respect to the selection point. In other cases, the magnifier instructions 2728 may display the magnified region with respect to the user input device. For instance, if the user is engaged with the scene via a touch-enabled display, the users input device may be a finger or stylus that may be occluding the magnifier if the magnifier was positioned about the initial selection point. In this case, the magnifier instructions 2728 may display the magnifier above or to the right of the position if the user input device with respect to the display. In this manner, the magnifier may be positioned such that the magnifier is not occluded by the user's finger or the stylus.

The magnifier instructions 2728 may also adjust the position of the magnified region in response to detecting a change in position of the user input. For instance, the magnifier instructions 2728 may detect an intersection between an edge of the magnified region and the user input (e.g., the user has moved the input device—mouse, stylus, finger, etc.) to the edge of the magnified region. In this example, the system may move the magnified region with the user input device until the user selects a final position for the selection point.

The magnifier instructions 2728 may maintain the magnified region on the display in response to detecting an intersection of an edge of the magnified region with an edge of the displayed portion of the scene. For example, if the user moves the input position to the edge of the display or viewing window the system may pan or move the display as well as the magnified region. In other cases, if the user moves the input position to the edge of the model or scene, the magnifier instructions 2728 may move the magnified region, such that the magnified region remains entirely on the display (e.g., that no portion of the magnified region is outside of the display). In some cases, the magnifier instructions 2728 may adjust the magnified region based on the edge of the display and the position of the input, such that the magnified region is not off the display and not occluded by the input device (e.g., the stylus, finger, or the like).

The measurement display instructions 2730 may be configured to display the measurement values determined by the measurement generation instructions 2722. In some cases, the measurement generation instructions 2722 may be configured to adjust the position of the displayed measurements as the user either traverses the scene or adjusts a viewpoint of the model, as discussed above. In some cases, the measurement generation instructions 2722 may limit the number of displayed measurements to below a predetermined threshold (such as 3, 5, 7, 10, or the like). In one example, the number of measurements displayed may be based at least in part on a distance between the measurements, zoom and/or proximity of the viewpoint to the displayed measurements, region of interest, or the like. For example, the further the user is from the model, the fewer measurements may be displayed.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
presenting, on the display, first type of model associated with a portion of a scene, the scene representative of a physical environment;
transitioning from the first type of model associated with the scene to a second type of model associated with the scene,
receiving a user input of a first position within the portion of the scene;
determining a first measurement associated with the physical environment based at least in part on the portion of the scene; and presenting, concurrently with the portion of the scene, the first measurement on the display;
wherein determining the first measurement associated with the physical environment further comprises, determining a surface associated with the user input and determining a type of measurement based at least in part on a characteristic of the surface.

2. The method as recited in claim 1, wherein the operations further comprise:
receiving a first user input associated with the second model of the portion of the scene;

determining a second measurement associated with the physical environment based at least in part on the first user input and the portion of the scene; and presenting, concurrently with the portion of the scene, the second measurement on the display.

3. The method as recited in claim 2, wherein the operations further comprise:

determining that the second measurement is occluded by the first measurement; and updating a position of the second measurement with respect to the display based at least in part on a position of the first measurement with respect to the display.

4. The method as recited in claim 2, wherein the operations further comprise:

presenting at least one measurement options on the display in response to receiving the first user input;

receiving a second user input associated with a first measurement option of the at least one measurement options; and wherein presenting, concurrently with the portion of the scene, the second measurement on the display is based at least in part on the first measurement option.

5. The method as recited in claim 1, wherein determining a first measurement associated with the physical environment further comprises one or more of the following:

determining a surface associated with a user input and determining a type of measurement based at least in part on a characteristic of the surface; or determining a type of the measurement based at least in part on the portion of the scene.

6. The method as recited in claim 1, wherein the operations further comprise:

receiving a first user input associated with the scene;

determining the first user input is less than or equal to a threshold from a feature of the scene; and adjusting a position of the first user input based at least in part on the feature of the scene; and wherein the feature includes one or more of:
  a surface;
  a local axis associated with the first user input;
  a global axis associated with the scene;
  a corner;
  a visual or textural edge;
  a surface edge;
  an intersection of two or more surfaces;
  an object in the scene; or
  a position parallel or perpendicular to a prior user input.

7. The method as recited in claim 6, wherein:

determining the first measurement associated with the physical environment based at least in part on the portion of the scene further comprises:

detecting a feature associated with the portion of the scene; and selecting one or more measurements based at least in part on the feature; and presenting, concurrently with the portion of the scene, the first measurement on the display further compromise presenting the one or more measurements on the display.

8. The method as recited in claim 1, wherein the operations further comprise:

presenting, concurrently with the scene, a clipping plane on the display;

receiving a first user input to adjust a position of the clipping plane from a first position with respect to the scene to a second position with respect to the scene; and updating the scene on the display based at least in part on the second position.

9. The method as recited in claim 1, wherein the first measurement is associated with an area defined by a boundary and the operations further comprise:

determining a largest circle within the boundary; and displaying the first measurement at a center of the largest circle.

10. A method comprising:

presenting, on a display, a scene representative of a physical environment;

receiving a first user input of a first position within the scene;

presenting, on the display, a first measurement option based at least in part on the first position; and presenting, on the display, a first measurement value associated with the first measurement option, the first measurement value representative of a physical measurement of a corresponding measurement of the physical environment, in an area defined by a boundary; and the operations further comprise:

determining a plurality of circles that fit within the region defined by the boundary, determining a largest circle within the boundary; and displaying the first measurement value at the center of the largest circle.

11. The method as recited in claim 10, further comprising:

presenting, in response to the first user input, a magnified region on the display; and receiving a second user input at a second position within the scene and associated with the magnified region; and presenting the first measurement option based at least in part on the second position.

12. The method as recited in claim 11, further comprising:

regenerating the scene based at least in part on a technique different than a technique used to originally generate the scene.

13. The method as recited in claim 11, further comprising:

presenting, concurrently with the scene, a clipping plane on the display;

receiving a second user input to adjust a position of the clipping plane from a first position with respect to the scene to a second position with respect to the scene; and updating the scene on the display based at least in part on the second position.

14. The method as recited in claim 11, further comprising:

transitioning from a first type of model associated with the scene to a second type of model associated with the scene; and wherein areas of reduced accuracy within the scene are available to receive user inputs in the first type of model and are prohibited from receiving the user inputs in in the second type of model.

15. One or more non-transitory computer-readable media storing instructions that, when executed, cause one or more processors to perform operations comprising:

presenting, on the display, a portion of a scene, the scene representative of a physical environment;

determining a first measurement associated with the physical environment based at least in part on the portion of the scene;

determining a boundary associated with the first measurement;

determining a plurality of circles that fit within the region defined by the boundary, determining a largest circle within the boundary; and presenting, concurrently with the portion of the scene, the first measurement on the display within a center of the largest circle.

16. The one or more non-transitory computer-readable media as recited in claim 15, wherein the operations further comprise:

receiving a first user input associated with the portion of the scene;

determining a second measurement associated with the physical environment based at least in part on the first user input and the portion of the scene; and presenting, concurrently with the portion of the scene, the second measurement on the display.

17. The one or more non-transitory computer-readable media as recited in claim 16, wherein the operations further comprise:

determining that the second measurement is occluded by the first measurement; and updating a position of the second measurement with respect to the display based at least in part on a position of the first measurement with respect to the display.

18. The one or more non-transitory computer-readable media as recited in claim 16, wherein the operations further comprise:

presenting at least one measurement options on the display in response to receiving the first user input;

receiving a second user input associated with a first measurement option of the at least one measurement options; and wherein presenting, concurrently with the portion of the scene, the second measurement on the display is based at least in part on the first measurement option.

19. The one or more non-transitory computer-readable media as recited in claim 15, wherein determining a first measurement associated with the physical environment further comprises one or more of the following:

determining a surface associated with a user input and determining a type of measurement based at least in part on a characteristic of the surface; or determining a type of the measurement based at least in part on the portion of the scene.

20. The one or more non-transitory computer-readable media as recited in claim 15, wherein the operations further comprise:

presenting, concurrently with the scene, a clipping plane on the display;

receiving a first user input to adjust a position of the clipping plane from a first position with respect to the scene to a second position with respect to the scene; and updating the scene on the display based at least in part on the second position.

* * * * *